(12) United States Patent
Jankura et al.

(10) Patent No.: US 10,901,301 B2
(45) Date of Patent: Jan. 26, 2021

(54) CLOSE-PACK, HIGH-ASPECT-RATIO CAMERA TRIPOD

(71) Applicant: Peak Design, San Francisco, CA (US)

(72) Inventors: Robb Jankura, San Francisco, CA (US); Matthew Thomas James, San Francisco, CA (US); Peter Dering, San Francisco, CA (US); Peter Lockett, San Francisco, CA (US); Arthur Viger, San Francisco, CA (US); Andrew Wheeler Gans, San Francisco, CA (US); Kiran Malladi, San Francisco, CA (US)

(73) Assignee: Peak Design, San Francisco, CA (US)

( * ) Notice: Subject to any disclaimer, the term of this patent is extended or adjusted under 35 U.S.C. 154(b) by 0 days.

(21) Appl. No.: 15/931,503

(22) Filed: May 13, 2020

(65) Prior Publication Data

US 2020/0363703 A1   Nov. 19, 2020

Related U.S. Application Data

(63) Continuation-in-part of application No. 16/501,118, filed on May 13, 2019.
(Continued)

(51) Int. Cl.
*G03B 17/56* (2006.01)
*F16M 11/32* (2006.01)
(Continued)

(52) U.S. Cl.
CPC .......... *G03B 17/561* (2013.01); *F16M 11/04* (2013.01); *F16M 11/10* (2013.01); *F16M 11/12* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS 1,798,446 A * 3/1931 Zerk .................... G03B 17/561
248/181.1
1,831,086 A * 11/1931 Zerk .................... F16M 13/022
248/181.1
(Continued)

*Primary Examiner* — Clayton E. LaBalle
*Assistant Examiner* — Kevin C Butler
(74) *Attorney, Agent, or Firm* — Run8 Patent Group, LLC; Peter Miller; Leah Raddatz

(57) ABSTRACT

A tripod includes: a hub defining a set of leg mounts; a set of legs configured to telescopically extend from the hub and couple to the set of leg mounts; a center column including a spherical end; and a head pivotably coupled to the spherical end. The head further includes: a base section; a camera platform arranged over the base section; a set of flanges extending below the base section and extending around the spherical end; a hat arranged over the spherical end; a pivot control ring arranged about the base section, configured to drive the hat into the spherical end to fix the head on the spherical end responsive to rotation in a first direction about the base section, and configured to retract the hat from the spherical end to unlock the head from the spherical end responsive to rotation in a second direction about the base section.

20 Claims, 12 Drawing Sheets

Related U.S. Application Data

(60) Provisional application No. 62/965,597, filed on Jan. 24, 2020.

(51) Int. Cl.
*F16M 11/28* (2006.01)
*F16M 11/04* (2006.01)
*F16M 11/18* (2006.01)
*F16M 11/12* (2006.01)
*F16M 11/10* (2006.01)

(52) U.S. Cl.
CPC ............ *F16M 11/18* (2013.01); *F16M 11/28* (2013.01); *F16M 11/32* (2013.01)

(58) Field of Classification Search
USPC .......................................................... 396/428
See application file for complete search history.

(56) References Cited

U.S. PATENT DOCUMENTS

| | | | | |
|---|---|---|---|---|
| 1,894,456 A * | 1/1933 | Zerk | ............... | F16M 11/16 248/181.1 |
| 2,143,606 A * | 1/1939 | Mooney | ............... | F16M 11/16 248/183.2 |
| 3,353,776 A * | 11/1967 | Clemens | ............ | F16M 11/2014 248/183.2 |
| 3,601,028 A * | 8/1971 | Tertocha | ............... | G03B 15/00 248/222.14 |
| 4,121,799 A * | 10/1978 | Michio | ............... | F16M 11/14 248/171 |
| 4,847,543 A * | 7/1989 | Fellinger | ............ | H04N 5/23299 318/628 |
| 5,993,077 A * | 11/1999 | Jones | ............... | G03B 27/323 248/187.1 |
| 6,877,915 B1 * | 4/2005 | Wei | ............... | F16M 11/105 348/143 |
| 7,789,356 B1 * | 9/2010 | Jones | ............... | F16M 11/32 248/178.1 |
| 10,288,987 B2 * | 5/2019 | Olmos-Calderon | | F16M 11/041 |
| 10,550,993 B2 * | 2/2020 | Verstrate | ............... | H01Q 3/04 |
| 2003/0226941 A1 * | 12/2003 | Crain | ............... | F16M 13/00 248/166 |
| 2003/0234326 A1 * | 12/2003 | Crain | ............... | F16M 11/28 248/166 |
| 2003/0235459 A1 * | 12/2003 | Crain | ............... | F16B 7/1463 403/170 |
| 2004/0004168 A1 * | 1/2004 | Crain | ............... | F16M 13/02 248/188.8 |
| 2007/0090237 A1 * | 4/2007 | Hsu | ............... | F16M 11/16 248/178.1 |
| 2010/0172643 A1 * | 7/2010 | Sudhana | ............... | F16C 11/106 396/428 |
| 2010/0218670 A1 * | 9/2010 | Keng | ............... | F16M 11/16 89/37.04 |
| 2010/0224745 A1 * | 9/2010 | Orlov | ............... | F16M 11/14 248/188.3 |
| 2012/0033960 A1 * | 2/2012 | Hashimoto | ........ | F16M 11/2064 396/428 |
| 2012/0181398 A1 * | 7/2012 | Salvato | ............... | F16M 11/10 248/122.1 |
| 2014/0226963 A1 * | 8/2014 | Ryan | ............... | F16M 11/32 396/428 |
| 2015/0023655 A1 * | 1/2015 | Hoof van | ............... | G03B 17/02 396/427 |
| 2015/0204479 A1 * | 7/2015 | Bryant | ............... | F16M 11/26 348/376 |
| 2016/0263310 A1 * | 9/2016 | Helbig | ............... | F16M 11/041 |
| 2019/0146312 A1 * | 5/2019 | Kiernan-Lewis | ...... | F16M 13/00 396/428 |

\* cited by examiner

CLOSE-PACK, HIGH-ASPECT-RATIO CAMERA TRIPOD

CROSS-REFERENCE TO RELATED APPLICATIONS

This Application claims the benefit of U.S. Provisional Application No. 62/847,174, filed on 13 MAY 2019, and U.S. Provisional Application No. 62/965,597, filed on 24 JAN. 2020, each of which is incorporated in its entirety by this reference.

This Application is a continuation-in-part application of U.S. patent application Ser. No. 16/501,118, filed on 13 MAY 2019, which is incorporated in its entirety by this reference.

TECHNICAL FIELD

This invention relates generally to the field of photography and more specifically to a new and useful close-pack, high-aspect-ratio camera tripod in the field of photography.

DESCRIPTION OF THE EMBODIMENTS

Figure 1:
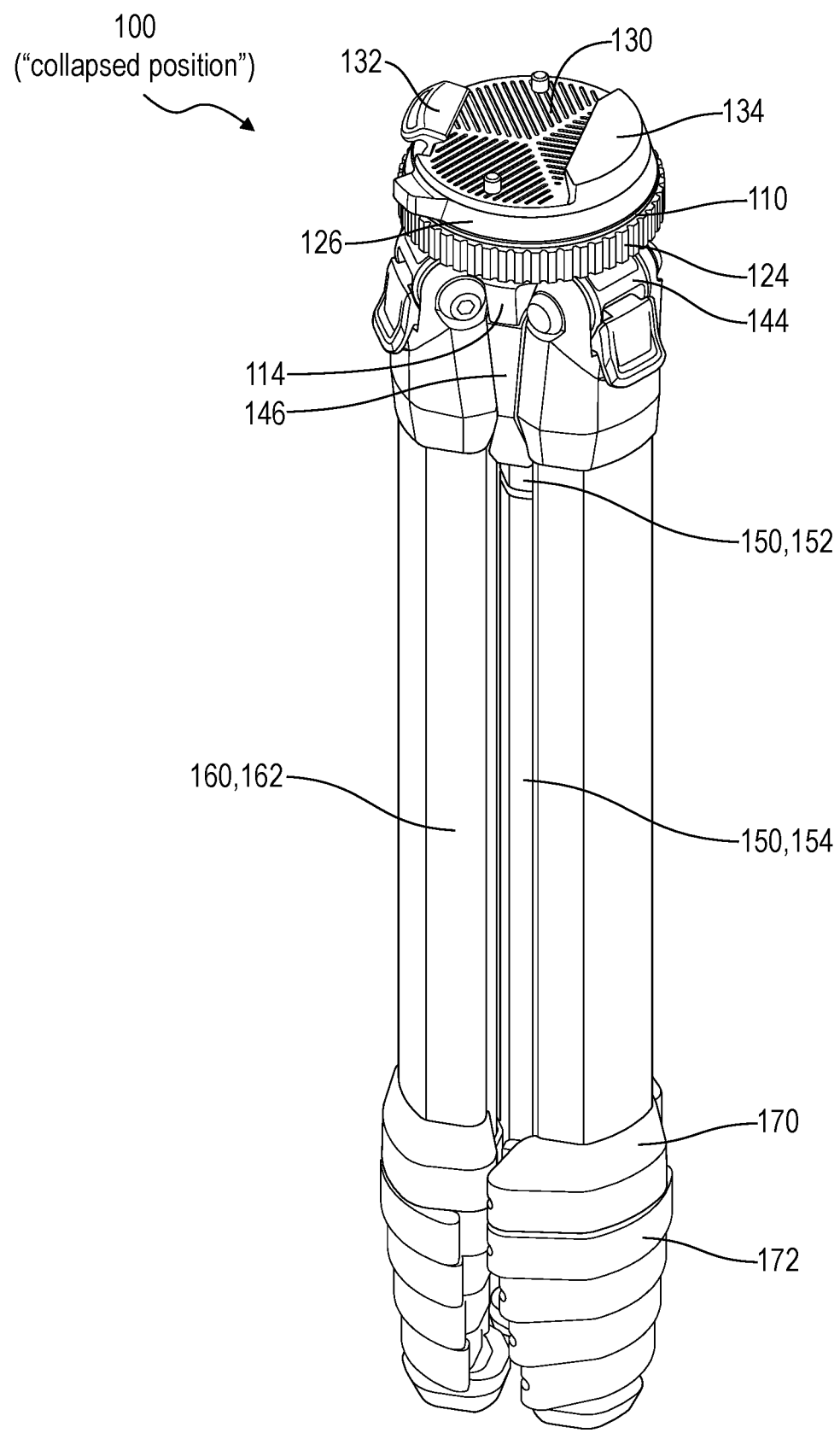
FIGS. 1-5 are schematic representations of a tripod.

The following description of the embodiments of the invention is not intended to limit the invention to these embodiments but rather to enable a person skilled in the art to make and use this invention.

1. Tripod

As shown in FIGS. 1-5, a tripod 100 includes: a hub 140 defining a center bore 142 and a set of leg mounts 144 arranged in a radial pattern about the center bore 142; a set of legs 160, each leg 160 in the set of legs 160 pivotably coupled to a leg mount 144 in the set of leg mounts 144 and configured to telescopically extend from the hub 14o; a center column 150 configured to translate within the center bore 142 of the hub 140 and including a spherical end 156 configured to nest between the leg mounts 144. The tripod further includes a head 110 pivotably coupled to the spherical end 156 and including: a base section 112; a camera platform 130 arranged over the base section 112, defining a rail 134 and a locking tab 132, and configured to transiently receive a camera adapter coupled to a camera; a set of flanges 114 arranged in the radial pattern, extending below the base section 112 opposite the camera platform 130, extending around a section of the spherical end 156, and configured to nest between the leg mounts 144; a hat 116 arranged in the base section 112 over the spherical end 156; a pivot control ring 124 arranged about the base section 112, configured to drive the hat 116 into the spherical end 156 to fix an orientation of the head 110 on the spherical end 156 responsive to rotation in a first direction about the base section 112, and configured to retract the hat 116 from the spherical end 156 to unlock the head 110 from the spherical end 156 responsive to rotation in a second direction about the base section 112.

In one variation, the tripod further includes a camera lock ring 126 arranged proximal the pivot control ring 124, concentric with the pivot control ring 124, and configured to drive the camera locking tab 132 toward the rail 134 to transiently lock the camera adapter between the camera locking tab 132 and the rail 134.

The tripod 100 includes a set of legs 160. Each leg 160 of the tripod 100 can include a series of nesting telescopic leg segments 162 wherein each leg segment—other than the first, largest leg segment—in a leg is configured to nest within an adjacent, larger leg segment of larger cross-section. Furthermore, the distal end of each leg segment—other than the last, smallest leg segment—in a leg can include a clamp assembly configured to selectively clamp an adjacent, smaller leg segment 162, thereby enabling this smaller leg segment 162 to telescope within the adjacent, larger leg segment 162. Each leg connects to the hub 140 via a leg mount 144 including a multi-stage leg position stop.

In one variation, the tripod 100 includes a spherical end 156 and a head 110 pivotably coupled to the spherical end 156, the head 110 including: a base section 112; a camera platform 130 arranged over the base section 112 and configured to transiently receive a camera adapter coupled to a camera; a threaded section 118 extending along a central axis of the head 110 and arranged over the spherical end 156; a sun gear 120 threaded onto the threaded section 118 and configured to translate along the threaded section 118 when rotated; a hat 116 arranged on to the sun gear 120 and facing the spherical end 156; a spring 117 arranged between the hat 116 and the sun gear 120 and configured to depress the hat 116 against the spherical end 156; a set of planet gears 122 arranged about and meshed with the sun gear 120; and a set of flanges 114 extending from the base section 112 opposite the camera platform 130, extending around a section of the spherical end 156, and arranged in a radial pattern about the spherical end 156. In this variation, the tripod 100 further includes a pivot control ring 124 arranged about the base section 112, comprising a ring gear meshed with the set of planet gears 122, and configured to: rotate the sun gear 120 about the threaded section 118 via the set of planet gears 122, drive the hat 116 toward the spherical end 156, clamp the spherical end 156 against the set of flanges 114, and fix an orientation of the head 110 on the spherical end 156 responsive to rotation in a first direction about the base section 112; and rotate the sun gear 120 about the threaded section 118 via the set of planet gears 122, retract the hat 116 from the spherical end 156, and unlock the head 110 from the spherical end 156 responsive to rotation in a second direction opposite the first direction.

2. Applications

Generally, the tripod 100 includes: a hub 140 defining a set of leg mounts 144 pivotably coupled to a set of legs 160; and a head 110 including a set of stacked control rings that enable a user to rapidly adjust pitch, yaw, and roll of a camera—mounted to the head 110—relative to the hub and legs and to rapidly install, lock, and remove the camera with a single hand in the same location. More specifically, the tripod 100 includes a set of stacked control rings that fall to hand in one compact location and thus enable a user to manipulate the position of a camera, and quickly mount and dismount the camera from the tripod 100. For example, the tripod can include a set of concentric control rings stacked just below the camera mount which may be fully engaged and disengaged with less than one full turn (e.g., less than 360-degrees), thereby allowing a user to quickly and easily move the head 110 a full 360-degrees in pan, easily move the head 110 nearly a full 180-degrees in tilt (e.g., pitch and roll), and then fully and confidently lock the tripod 100 in place without repositioning her hand or removing her hand from the head 110.

Furthermore, by including the set of stacked, concentric control rings, the tripod 100 condenses the pan, tilt, and lock/unlock controls in one compact location, thereby: limiting features projecting outwardly from the head 110; minimizing effective diameter of the head 110; increasing compactness and space efficiency of the tripod 100 when fully collapsed; reducing weight of the tripod 100; and improving ease of transport, storage, and accessibility of the tripod 100 for a user.

The head 110 of the tripod 100 is mounted to a center column 150 configured to run inside a center bore 142 of the hub 140, and the hub 140 defines a set of leg mounts 144 that couple and support a set of legs 160. The center column 150 defines a spherical end 156, and the head 110 defines a set of flanges 114 extending from the bottom of the head 110 to form a socket around the spherical end 156, which enables a user to tilt the head 110 relative to the hub 140. In particular, the head 110 defines a set of flanges 114 arranged in a radial pattern matched to a radial pattern of leg mounts 144 extending from the hub 140 such that—when the tripod 100 is fully collapsed—the head 110 is radially offset (e.g., by 60-degrees) from the hub 140 to enable the flanges 114 and the leg mounts 144 to nest (or "interlock"), to encapsulate the spherical end 156, and to thus achieve high vertical and volumetric packing efficiency. The interlocking head 110, hub 140, and leg sections form a solid and robust collapsed state—such that the tripod 100 maintains a substantially uniform effective diameter when collapsed—which enables the user to pack away the tripod 100 without extraneous knobs or protrusions snagging on other equipment or bag flaps/openings. For example, when fully collapsed (e.g., in the collapsed position), the tripod 100 can approximate a cylindrical form with minimal negative space, thereby exhibiting high volumetric efficiency. Furthermore, in this example, the center column 150 can define a triangular section such that—when the center column 150 is fully retracted from the hub 140 with the head 110 nested around the leg mounts 144—the interior faces of the legs 160 mate (or fall very near) the exterior faces of the center column 150, thereby minimizing negative space inside the cylindrical exterior form approximated by the tripod 100 in this collapsed state.

In one variation, the radial distance between flanges 114 can be less than the radial width of the center column 150 such that the head 110 can tilt nearly 180-degrees about the spherical end 156 in both pitch and yaw directions. For example, a user may: shoot a first series of photos with her camera—installed on the head 110—retained in a landscape position by the head 110; and then manipulate the pivot control ring 124 to rapidly unlock, tilt, and relock the head 110 to relocate the camera in a portrait position. The user may also manipulate the pivot control ring 124 to loosen the head 110 on the spherical mount in order to enable more subtle pitch adjustments of the camera in this portrait position, such as within a range of 120-degrees less a sum of radial widths of the center column 150 and one flange.

Each leg 160 of the tripod 100 includes a set of nested leg segments 162 (or "telescoping stages"), and the tripod 100 also includes a center column 150, all of which cooperate to enable the tripod 100 to expand to a height several times (e.g., four times) the height of the tripod 100 in the collapsed state. When opened, the tripod 100 can occupy a range of footprints and heights, thereby defining a robust structure for support of heavy camera equipment (e.g., sandbags, telephoto lenses, etc.) and supporting a wide range of applications and uses for a photographer.

3. Head

Figure 2:
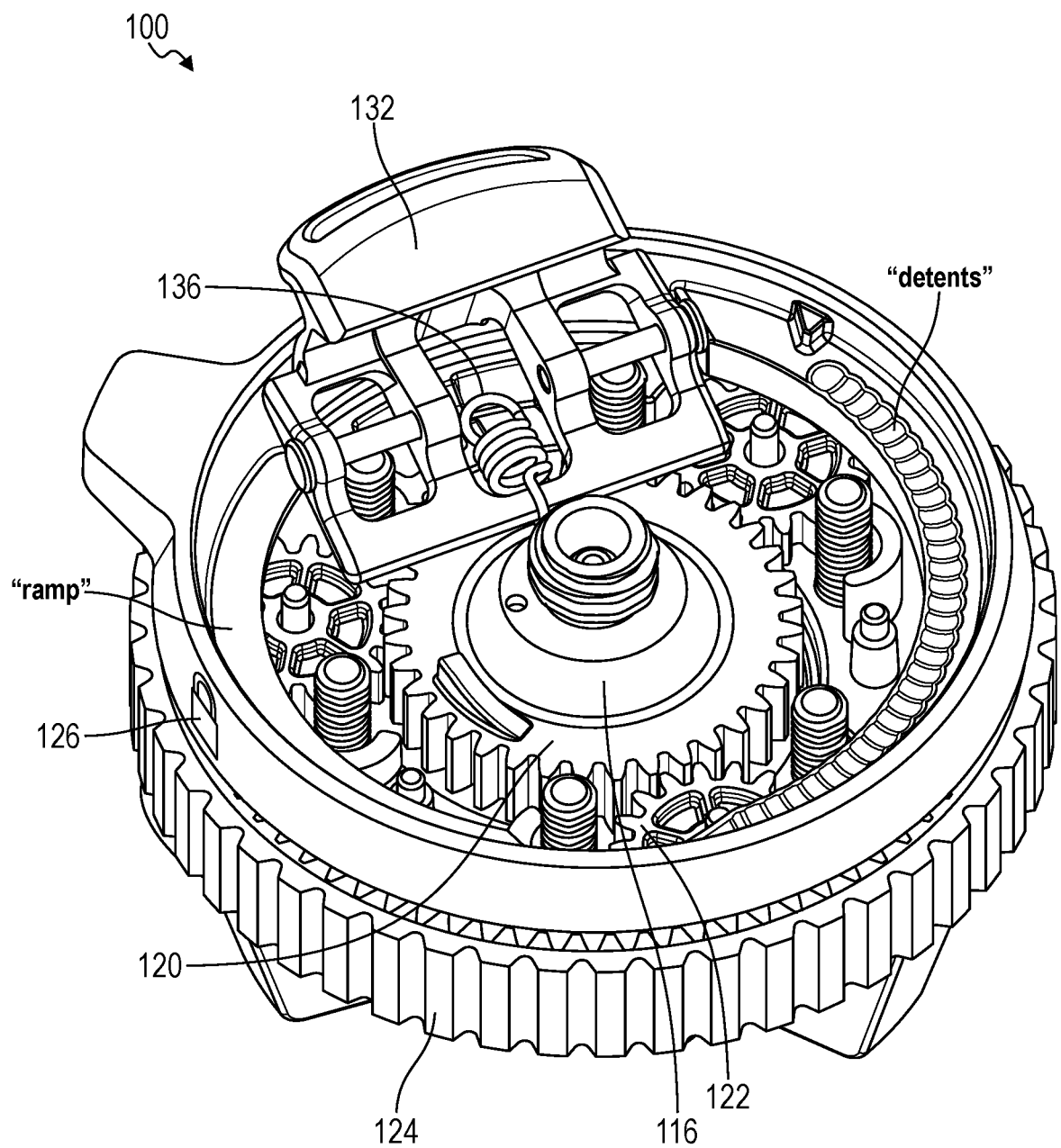
Figure 3:
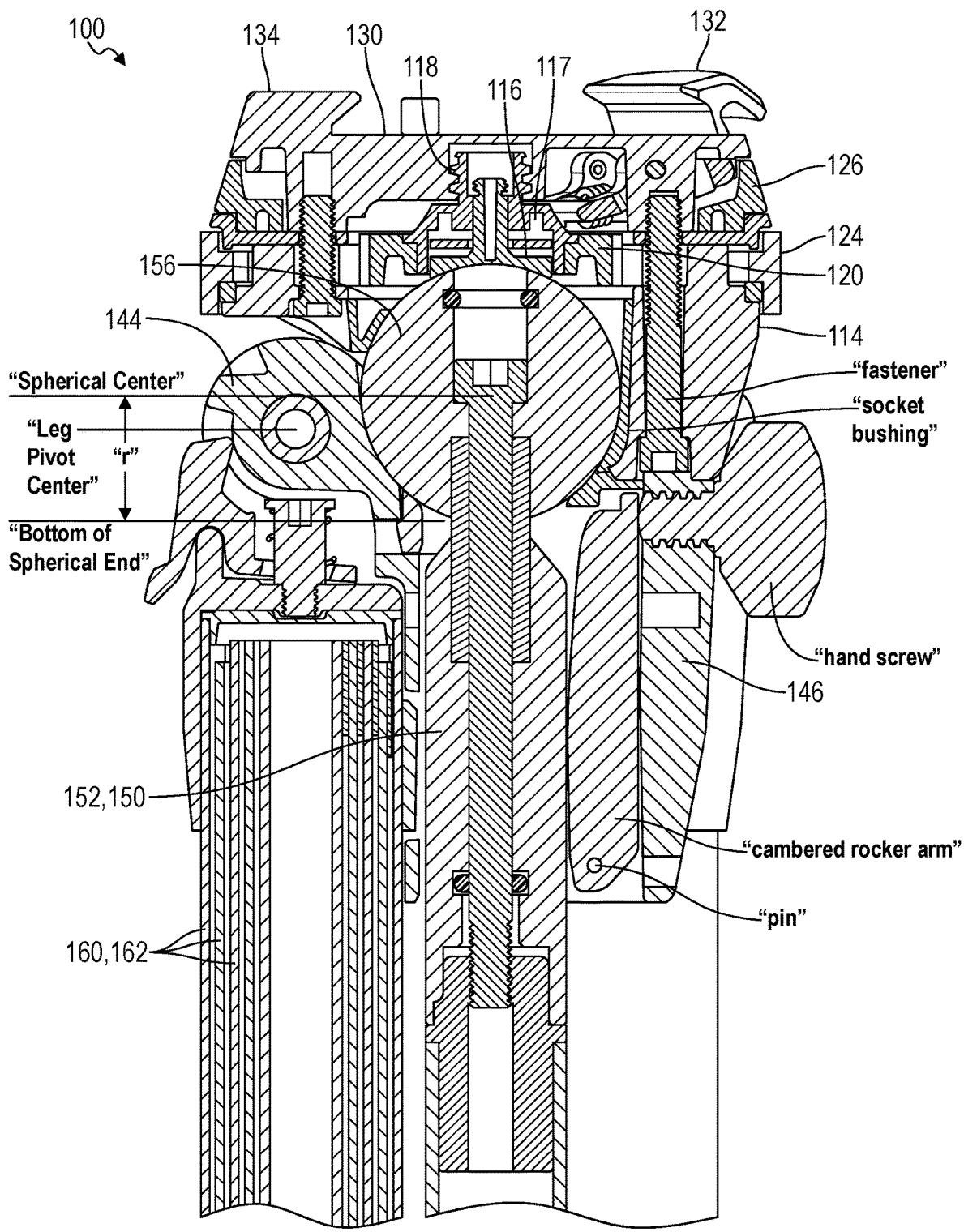

As shown in FIGS. 1-3, the head 110 includes: a camera platform 130 arranged orthogonally to the central axis of the head 110; a camera lock ring radially operated about the central-axis of the head 110 to interface with a locking tab 132; a flanged socket—including a set of (e.g., three) flanges arranged in a radial pattern—configured to receive the spherical end 156 on the center column 150; a hat 116 interposed between the camera platform 130 and the spherical end 156 and configured to cooperate with the set of flanges to clutch the spherical end; and a pivot control ring 124 radially-operable (i.e., rotatable) about the central-axis of the head 110 to drive the hat 116 into and away from the spherical end 156 in order to lock and release the head 110 from the spherical end 156, respectively.

In one implementation, the head further includes: a threaded section 118 (e.g., a threaded bore or a threaded shaft) extending along a central axis of the head 110 and arranged over the spherical end 156; a sun gear 120 threaded onto the threaded section 118 and configured to translate along the threaded section 118 when rotated; and a set of planet gears 122 arranged about and meshed with the sun gear 120. The pivot control ring 124 can also include a ring gear mated to the set of planet gears 122; and the hat 116 can be mounted to the sun gear 120. The head 110 can also include a spring 117 arranged between the hat 116 and the sun gear 120 opposite the spherical end 156 and configured to bias the hat 116 toward the spherical end 156 and to clutch the spherical end 156 between the hat 116 and the set of flanges 114, thereby limiting rotation of the head 110 on the spherical end 156 even when the pivot control ring 124 is unlocked with the sun gear 120 spun up the threaded section 118 and retracted from the spherical end 156. Therefore, rotation of the pivot control ring 124 about the head 110 in a first direction can rotate the set of planet gears 122 in a second direction and thus rotate the sun gear 120 in the first direction, thereby: spinning the sun gear 120 down the threaded section 118; compressing the spring 117 between the sun gear 120 and the hat 116; positively engaging a leading face of the sun gear 120 against a back face of the hat 116; and thus driving the hat 116 against the spherical end 156 to lock the spherical end 156 between the hat 116 and the set of flanges 114—thereby locking the pitch, yaw, and roll position of the head 110 on the spherical end 156. Similarly, rotation of the pivot control ring 124 about the head 110 in the second direction can rotate the set of planet gears 122 in the first direction and thus rotate the sun gear 120 in the second direction, thereby: spinning the sun gear 120 up the threaded section 118; retracting the leading face of the sun gear 120 from the back face of the hat 116; (partially) releasing the spring 117; and thus reducing compression of the spherical end 156 between the hat 116 and the set of flanges 114—thereby unlocking the head 110 from the spherical end 156.

Therefore, the threaded section 118, the sun gear 120, and the set of planet gears 122 can cooperate with the pivot control ring 124, the hat 116, and the spherical end 156 to lock and unlock an orientation of the head 110 about the spherical end 156.

The camera platform 130 includes a substantially planar top surface configured to receive the base or side of a camera, camera mount, or adapter. The camera platform 130 also includes a projected fixed rail 134 to mate against a side of a camera, camera mount, or adapter. The operable locking tab 132 cooperates with the fixed rail 134 to locate and retain a camera adapter mounted to a camera in order to restrict movement of the camera relative to the head 110. Furthermore, the head 110 can include a spring 136 that biases the camera locking tab 132 toward the fixed rail 134 in order to snap the camera adapter onto the camera platform 130 when the camera is offered up to the head 110. Moreover, the camera lock ring 126 can define a ramp or cam that drives and retains the camera locking tab 132 toward the fixed rail 134 in order to lock the camera adapter between the camera locking tab 132 and the camera fixed rail 134. The camera lock ring 126 slides around the central axis of the head 110. Therefore, the fixed rail 134, the camera locking tab 132, the spring 136, and the camera lock ring 126 can cooperate to enable a user to drop the camera onto the head 110 with her left hand and then—while the spring 136 drives the camera locking tab 132 against the camera adapter to loosely retain the camera on the camera platform 130—rotate the camera lock ring 126 with her left hand to fully lock the camera to the head 110 (e.g., all while reaching for a lens in her camera bag with her right hand).

Then, the user may slip her left hand down (e.g., by approximately 10 millimeters) to locate her fingers off of the camera lock ring 126 and onto the pivot control ring 124, rotate the pivot control ring 124 to loosen the head 110 on the spherical end 156, and adjust the tilt and pan of the head 110—and therefore the camera—relative to the hub 140 to locate a target scene in the field of view of the camera before retightening the pivot control ring 124. The user may begin shooting the target scene immediately thereafter.

Furthermore, the user may keep her left hand on the head 110 (with her fingers in contact with the pivot control ring 124) in order to make on-the-fly pan and tilt adjustments to the camera by loosening the pivot control ring 124 with her left hand, repositioning the head 110 with her left hand, and then retightening the pivot control ring 124 again with her left hand before resuming shooting.

Finally, the user may raise her left hand up the head 110 to engage the camera lock ring 126 and rotate the camera lock ring 126 to release the camera locking tab 132; the spring 136 can continue to bias the camera locking tab 132 toward the fixed rail 134 in order to retain the camera on the head 110 until the user biases the camera locking tab 132 (e.g., with her left hand) to retrieve the camera.

Therefore, the head 110 can define a compact set of stacked controls that enable a user to rapidly and easily install, adjust, and remove a camera from the tripod 100 with a single hand.

3.1 Camera Platform

The camera platform 130 can include a top section that defines: a camera platform 130 (e.g., a grooved or textured surface) configured to carry a vertical load of a camera, camera mount, or other adapter; a fixed rail 134 extending along a first end of the camera platform 130 surface and defining an undercut section 190; and a pass-through for the camera locking tab 132 at a second end of the camera mount surface. The camera platform 130 can also include a spring 136 that biases the camera locking tab 132 toward the fixed rail 134 and that enables retraction of the camera locking tab 132 when a camera mount is installed over the camera mount surface. The camera locking tab 132 can similarly define an undercut section 192 and can cooperate with the fixed rail 134 to transiently receive and retain a camera, a camera mount, or other adapter over the camera mount surface. The camera platform 130 also includes a bottom section that defines: a threaded section 118 (or threaded shaft) configured to mate with the threaded end of the sun gear 120; and a bore for a spring 117 and a detent-pin configured to engage detent surfaces (e.g., ridges) along the adjacent camera lock ring 126.

In one implementation, the camera platform 130 can be manufactured (e.g., cast, machines) from aluminum, steel, or a rigid polymer.

3.2 Camera Lock Ring

Figure 11:
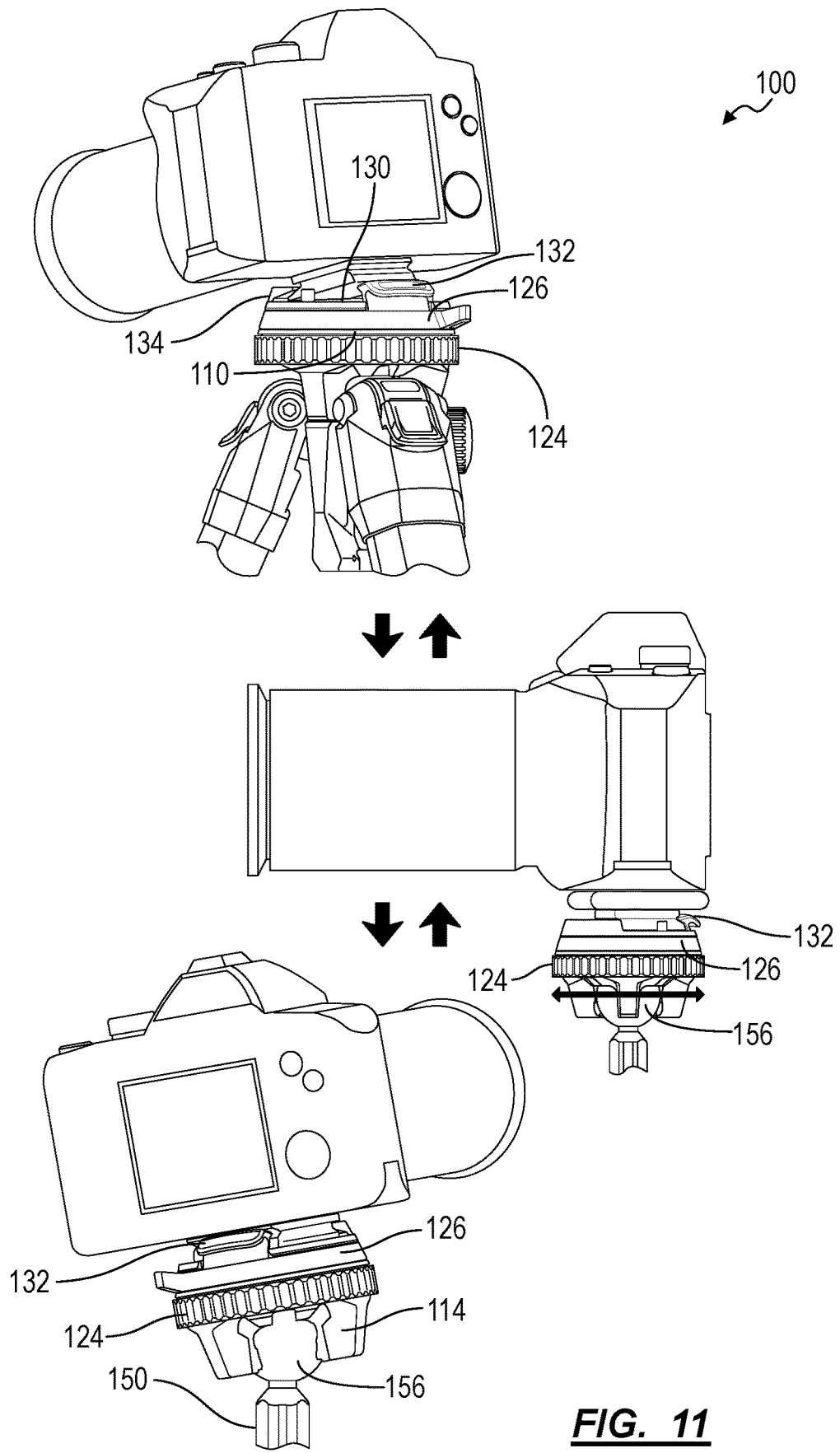
FIG. 11 is a schematic representation of the tripod.

In one implementation, as shown in FIG. 11, the head 110 includes a camera lock ring 126 arranged proximal and concentric with the pivot control ring 124 and configured to drive the camera locking tab 132 toward the fixed rail 134 to transiently lock the camera adapter between the camera locking tab 132 and the fixed rail 134.

In one implementation, the camera lock ring 126 includes an annular ring including: on a first face, a set of detents on a first side configured to interface with a spring-loaded detent-pin; and on a second side, a ramp configured to interface with the camera locking tab 132 such that rotating the annular ring about the central axis of the head 110 forces the camera locking tab 132 into a series of locked positions along the ramp, which dynamically fastens the camera, camera mount, or camera adapter to the camera platform 130. In this implementation, the camera locking tab 132 can be configured to actuate into a recess of the camera, camera mount, and/or camera adapter to restrict movement of the camera responsive to rotation of the annular ring. The camera locking tab 132 can be spring-loaded and interface with a ramp on a ring (e.g., camera lock ring 126) parallel to the camera platform 130. As the annular ring rotates about the central axis of the head 110, the ramp can force the tab into a fixed position, locking the camera (or camera accessory) to the camera platform 130. A series of detents sit opposite the ramp on the ring and interface with a spring-loaded detent-pin to stagger the locking positions of the tab.

In one variation, the camera lock ring 126 includes a protrusion extending radially outward (e.g., a finger tab) to interface with a user's finger during one-handed manipulation. The annular ring can sit in a plane parallel to the camera platform 130. In one variation, the ring can be arranged immediately below the camera platform 130. For example, the annular ring can be manufactured in aluminum, plastic, or carbon fiber.

Therefore, when the camera lock ring 126 is unlocked, the camera locking tab 132 can pivot or slide within the camera platform 130 to engage and retain a camera mount, thus enabling a user to locate one end of the camera mount within the undercut section 190 of the fixed rail 134, rest the opposing end over the camera locking tab 132, and press down. When the user rotates the camera lock ring 126 to the lock position, a cam surface defined by the camera lock ring 126 closes toward the camera locking tab 132 and then engages the camera locking tab 132 to prevent retraction of the camera locking tab 132 from the rail 134 responsive to the user pushing or pulling on the camera locking tab 132, thereby positively locking the camera mount between the camera locking tab 132 and the rail 134.

More specifically, the camera lock ring 126 can overdrive the camera locking tab 132 toward the fixed rail 134 and thus function as an ancillary lock for the camera platform 130.

3.3 Locking Tab

In one implementation, the camera locking tab 132 and the spring 136 cooperate to retain a camera mount—affixed to a camera—on the camera platform 130 without further positive lock by the camera lock ring 126 such that the user may push, pull, and/or pivot the camera without the camera locking tab 132 releasing the camera mount from the camera platform 130.

Figure 12:
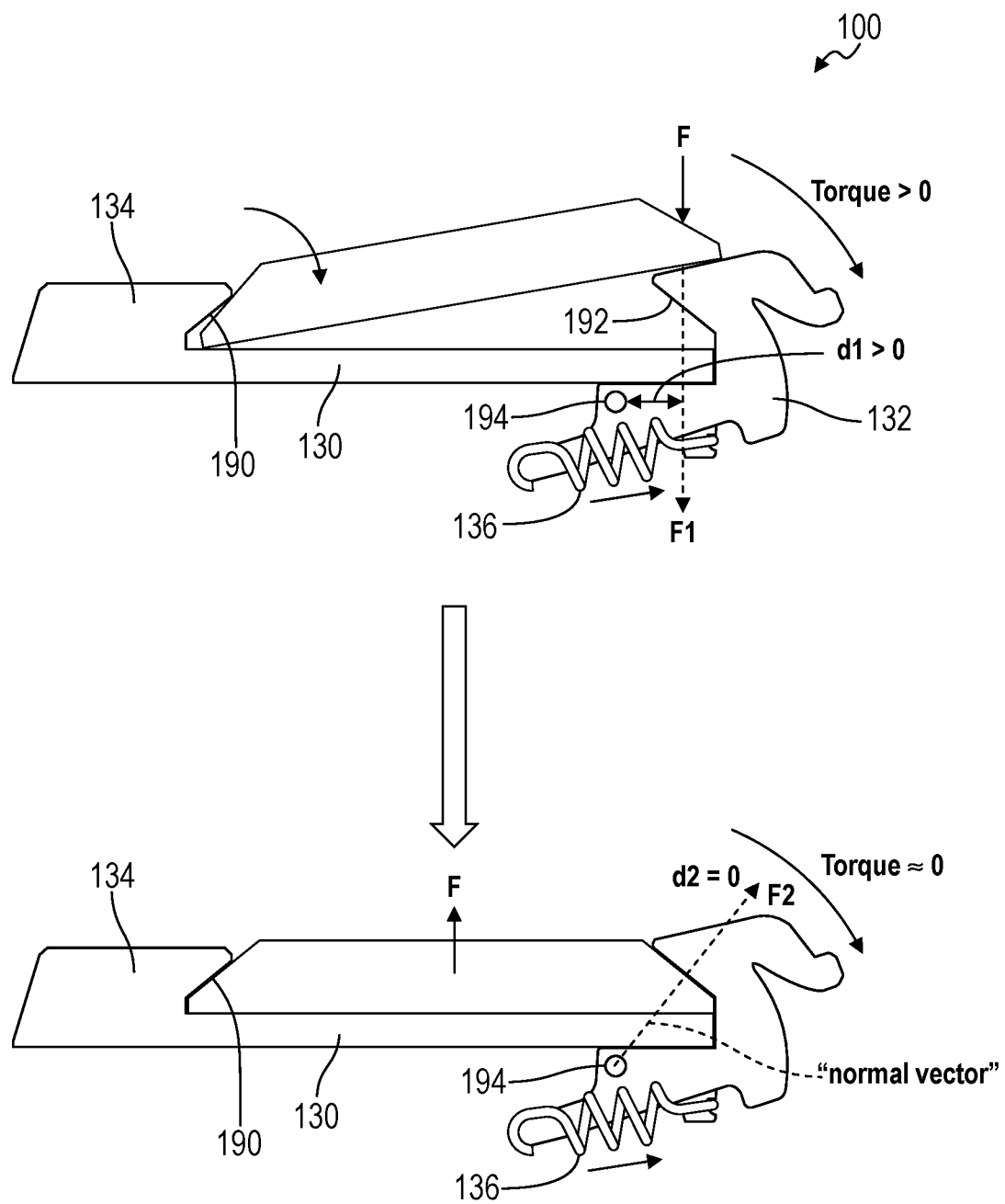
FIG. 12 is a schematic representation of a camera locking tab.

In one implementation shown in FIG. 12, the undercut section 190 of the fixed rail 134 can be configured to mate with a first beveled face of a camera mount (or a "camera adapter"). The undercut section 192 of the camera locking tab 132 can be configured to mate with a second beveled face of the camera mount opposite the first beveled face. For example, the undercut sections 190, 192 of the fixed rail 134 and the camera locking tab 132 can define complementary 45° beveled faces when assembled over the camera platform 130. In this implementation, the camera locking tab 132 is mounted to and pivots about a pivot 194 (e.g., a pin) arranged under the camera platform 130. The spring 136 is laterally offset from the pivot 194 and drives (e.g., pivots) the camera locking tab 132 upward to mate the undercut section 192 against the second beveled face of the camera mount and thus retain the camera mount on the camera platform 130.

In particular, the pivot 194 can be located along (or near) a vector that intersects and is normal to the undercut section 192 of the camera locking tab and the second beveled face of the camera mount when assembled over the camera platform 130. Because the pivot 194 is located along this vector: the effective lever arm length of the camera mount applied to the camera locking tab 132 is null (or nearly null) a lever arm; and the effective torque applied on the camera locking tab 132 by the camera mount—such as when the camera is pulled or rotated over the camera platform 130—is null (or nearly null) and (nearly) decoupled from the magnitude of the force or torque applied to the camera. Furthermore, because the spring 136 is laterally offset from the pivot 194, this effective torque applied on the camera locking tab 132 by the camera mount is less than the opposing torque applied to the camera locking tab 132 by the spring 136 such that the camera locking tab 132 remains engaged to the camera mount despite the magnitude of the force or torque applied to the camera. Thus, when a user pushes, pulls, or pivots the camera, the resulting torque to open the camera locking tab 132 is (approximately) null, and the camera locking tab 132 therefore does not rotate away from the camera mount. Therefore, the camera locking tab 132 remains fixed in its closed position and retains the camera mount and the camera in place over the camera platform 130 despite forces applied to the camera.

However, the camera locking tab 132 can pivot about the pivot 194 responsive to a user pushing or pulling downward on the camera locking tab 132 directly, which withdraws the undercut section 192 away from the adjacent second bevel on the camera mount and enabling the user to lift the camera and the camera mount off of the camera platform 130.

Furthermore, responsive to a downward force on the top of the camera locking tab 132 over the undercut section 192 by the camera mount during installation of the camera mount onto the camera platform 130, the camera locking tab 132 can pivot downward about the pivot 194, thereby withdrawing the undercut section 192 away from the camera platform 130 and enabling the camera mount to move downward toward the camera platform 130. In particular, the user may insert the first beveled face of the camera mount within the undercut section 190 of the fixed rail 134, rest the second beveled face of the camera mount over the camera locking tab 132, and press down. The force of the second beveled face of the camera mount on the camera locking tab 132 counters the spring 136 and applies a torque to the camera locking tab 132, thereby rotating the camera locking tab 132 downward about the pivot 194 to open the camera platform 130 to accept the camera mount. The second beveled face of the camera mount slides along the apex of the camera locking tab 132 over the undercut section 192 as the camera locking tab 132 opens and eventually drops past the apex of locking tab 132 to seat under the camera locking tab 132 with the second beveled face positioned against the undercut section 192 of the camera locking tab 132 and with the base of the camera mount now in contact with the top surface the camera platform 130. The spring 136 then automatically drives the camera locking tab 132 upward to positively clutch the camera mount between the rail 134 and the camera locking tab 132.

3.4 Controls Chassis

A controls chassis: is interposed between the camera platform 130 and the set of flanges 114; houses the sun gear 120, planet gears 122, and hat 116; and locates the pivot control ring 124 below the camera lock ring 126. The controls chassis can also define a set of bear surfaces or posts configured to locate the planet gears in a radial pattern about the central axis of the head 110, as shown in FIG. 2.

3.4.1 Pivot Control Ring

The tripod includes a pivot control ring 124 arranged about the base section 112 of the head 110 and configured to fix an orientation of the head 110 on the spherical end 156 or unlock the head 110 from the spherical end 156 responsive to rotation by a user.

The pivot control ring can define an outer annular ring, such as including a splined or grooved outside face configured for hand manipulation. The interior face of the pivot control ring 124 can also define an annular ring gear configured to mesh with the set of planet gears 122 arranged within the controls chassis and camera platform 130.

The pivot control ring can be arranged on the head 110 of the tripod 100 and can be accessible by hand. Rotating the pivot control ring thus rotates the planet gears 122, which rotates the sun gear 120 about the threaded section 118 within the camera platform 130, thereby causing the sun gear 120 to translate linearly along the central axis of the head.

3.4.2 Planetary Gearbox

The tripod 100 also includes a planetary gearbox—including the sun gear 120 and the set of planet gears 122—arranged in the controls chassis and configured to transform rotation of the pivot control ring 124 into linear movement of the hat 116.

The sun gear 120 revolves about the central axis of the head 110. The height of the sun gear 120 can approximate (or exceed) the sum of: the height of the planet gears 122; and the range of vertical motion of the sun gear 120 between the locked and unlocked positions of the pivot control ring 124. The sun gear 120 includes a coaxial (internal or external) threaded section that mates with (i.e., threads onto) the threaded section 118 in the head such that the sun gear 120 raises and lowers within the head—and thus retracts and advances the hat 116 toward the spherical end 156—when the pivot control ring 124 is rotated abut the head 110. For example, the threaded section 118 within the head 110 and the sun gear 120 can define single-lead or double-lead ACME threads, which may limit friction between the threaded section 118 and the sun gear 120 when the sun gear 120 is rotated via the pivot control ring 124.

Furthermore, each planet gear 122: can include a shaft or pin extending parallel to the central axis of the head 110 and seated in complementary mounting bores in the controls chassis and the camera platform 130; and can mesh with both the pivot control ring 124 and the sun gear 120 such that rotation of the pivot control ring 124 rotates the sun gear 120 about the threaded section 118 and raises and lowers the sun gear 120—and therefore the hat 116—toward the spherical end 156. In one variation, the pivot control ring 124 can be arranged immediately below and coaxial with the camera lock ring 126.

3.4.3 Friction Hat

In one implementation, the friction hat 116 (hereinafter the "hat") is contiguous with the sun gear 120. For example, the sun gear 120 can include a concave spherical cup section coaxial with the threaded section 118, facing the spherical end 156, and configured to engage and clutch against the spherical end 156 when actuated by the pivot control ring 124.

Alternatively, the hat 116 can be distinct from and coupled to the sun gear 120. For example, the sun gear 120 can define a shoulder (or a bore) coaxial with the threaded section 118; and the hat 116 can include a complementary feature that mates with, slides along, and rotates about the shoulder (or bore) of the sun gear 120. In this implementation, the hat 116 can also define a concave spherical cup section coaxial with the threaded section 118, facing the spherical end 156, and configured to engage and clutch against the spherical end 156 when actuated by the pivot control ring 124. The tripod 100 can also include the spring 117 arranged about this shoulder (or within this bore) and configured to bias the rear face of the hat 116 away from the sun gear 120 and toward the spherical end 156. Alternatively, a set of (e.g., three) counterbores can be arranged in a radial pattern about the sun gear 120 and/or the hat 116, and a set of springs 117 can be installed in these counterbores to bias the rear face of the hat 116 away from the sun gear 120 and toward the spherical end 156.

Therefore, the spring(s) 117 can depress the rear face of the hat 116 off of the sun gear 120 and toward the spherical end 156. When the pivot control ring 124 is rotated toward the lock position, the sun gear 120 can run down the threaded section 118 and drive toward the spherical end 156 such that the shoulder (or the bore) drives into the hat 116, thereby compressing the spring 117. In addition, because the hat 116 is radially isolated from the sun gear 120 and biases against the spherical end 156 by the spring 117, the hat 116 may remain stationary against the spherical end 156 as the sun gear 120 is driven down toward the spherical end 156, thereby reducing wear on the hat 116 and the spherical end 156. Further rotation of the pivot control ring 124 drives the leading face of the sun gear 120 into contact with the rear face of the hat 116 and then rigidly locks the hat 116 against the spherical end 156, thereby rigidly locking the spherical end 156 between the hat 116 and the set of flanges 114.

More specifically, when the pivot control ring 124 is rotated in a first direction, the ring gear integrated into the pivot control ring 124 rotates the set of planet gears 122, which in turn rotate the sun gear 120 in the first direction, thereby unthreading the sun gear 120 from the threaded section 118 of the head 110, driving the hat 116 into the spherical end 156 below, and thus clamping the spherical end 156 against the flanges 114 extending from the base section 112 around the spherical end 156 below. Similarly, when the pivot control ring 124 is rotated in the opposite direction, the ring gear rotates the set of planet gears 122, which in turn rotate the sun gear 120 in a second direction, thereby threading the sun gear 120 into the threaded section 118 of the head 110, retracting the hat 116 from the spherical end 156 below, and thus releasing the spherical from the flanges 114 below.

Furthermore, when the sun gear 120 is retracted from the spherical end 156, the spring 117 can function to drive the hat 116 into the spherical end 156 in order to maintain a minimum amount of friction between the hat 116 and the spherical end 156, thereby retaining the orientation of the head 110 relative to the spherical mount and preventing rotation of the head 110 relative to the spherical end 156, such as when a user rotates the pivot control ring 124 in the first direction to tighten the hat 116 against the spherical end 156. More specifically, the spring 117 and the hat 116 can cooperate to resist a torque applied to the pivot control ring 124 in order to prevent rotation of the head 110 relative to the spherical end 156 when the pivot control ring 124 is rotated—such as within a single hand—in the first direction to tighten the hat 116 onto the spherical end 156.

3.4.4 Panning Control Ring

In one implementation, the head 110 includes a panning control ring 128. In this implementation, the head defines an upper body coupled to the base section 112 and rotatable about a pan axis of the base section 112. The panning control ring 128 can be arranged in between the camera lock ring 126 located on the upper section and the pivot control ring 124 located on the base section 112 and configured to lock the upper body to the lower body responsive to rotation in the first direction about the base section 112. Further, the panning control ring 128 can be configured to unlock the upper body from the base section 112 responsive to rotation in the second direction.

For example, the controls chassis can couple to the camera platform 130 via a radial bearing or bushing and define an upper section containing a second threaded section. The camera platform 130 can include a shoulder adjacent the upper section of the controls chassis, with the panning control ring 128 threaded onto the second threaded section and abutting the shoulder of the controls chassis. In this example, rotation of the panning control ring 128 in a first direction threads the panning control ring 128 downward onto the second threaded section, thereby engaging and constraining the shoulder of the camera platform 130 between the panning control ring 128 and the controls chassis. Rotation of the panning control ring in a second direction unthreads the panning control ring 128 from the second threaded section, thereby releasing the shoulder of the camera platform 130 from between the panning control ring 128 and the controls chassis and enabling the camera platform 130 to rotate—or "pan"—about the controls chassis.

The panning control ring 128 may be operated by a user with one hand by actuating the ring radially about the central axis of the head 110.

3.4.5 Stacked Control Rings

The control rings on the head 110 can be stacked on parallel planes, such that all control rings are operated by rotating the respective control rings about a shared central axis (e.g., the central axis of the head 110). The stacked configuration allows a user to operate all controls using one hand, and creates a compact and robust form factor. The control rings can each have unique outer textures (e.g., splining, knurling, etc.), such that a user may discern each control ring by touch/feel alone.

To maintain a small form factor and small effective diameter, the head 110 can be free of screw-knobs or hand-knobs. Moreover, each control ring can be fully engaged or disengaged by a single turn (or less), such that a user may lock or unlock all control rings with a single motion.

In one implementation, the head 110 includes the set of stacked control rings including the camera lock ring 126, the panning control ring 128, and the pivot control ring 124. The head 110 includes an upper body coupled to the base section 112 and rotatable about a pan axis of the base section 112. In this implementation, the panning control ring 128 is arranged in between the camera lock ring 126 located on an upper section of the head 110 and the pivot control ring 124 located on the base section 112. Further, the panning control ring 128 can be configured to lock the upper body of the head 110 to the base section 112 of the head 110 responsive to rotation in the first direction about the base section 112 and unlock the upper body from the base section 112 responsive to rotation in the second direction. Thus, when the upper body is unlocked from the base section, a user may continue operating each control ring as the camera lock ring 126 is located on the upper section of the head 110 and interacts with other components (e.g., locking tab 132, rail 134) on the upper section and the pivot control ring 124 is located on the base section 112 and interacts with components (e.g., hat 116, sun gear 120, planet gears 122) on the base section 112 and extending below.

3.5 Base Section

A second side of the base section 112 includes a set of flanges 114 extending downward from the head 110, which form an exposed spherical socket configured to receive and hold the spherical end 156.

In one implementation, the spherical socket includes three flanges 114 spaced at 120 degrees around the central axis of the head 110. The flanges 114 can be configured to fit (e.g., nest) between the leg mounts 144 of the hub 140 section when the tripod 100 is in a full or partially-collapsed state for vertical packing efficiency. Each flange includes a concave surface on a side facing the inner socket area. A socket bushing can sit between the flanges 114 and the spherical end 156. When the pivot control ring 124 is engaged, the reaction forces on the inner surfaces of the flanges 114 engage with the spherical socket bushing, which locks the spherical end 156 in a fixed position.

In one implementation, the base section 112 includes a set of flanges 114, each flange defining a pliable tip in contact with the spherical end 156. The spherical end 156 can include a base material (e.g., an aluminum base material) and a surface coating deposited over the base material, such that pliable tips of the flanges 114 contact the surface coating of the spherical end 156. The spring 117 of the head 110 can be preloaded to clutch the spherical end 156 between the hat 116 and pliable tips of the set of flanges. In this implementation, the spring rate and preload of the spring 117 can be matched to the surface finish of the spherical end 156 and a coefficient of friction of the pliable tips of the flanges 114 such as to retain an orientation of the head 110 on the spherical end 156 during rotation of the pivot control ring 124 in the first direction.

For example, the base section 112 can include the set of flanges 114, each flange including a rubber tip in contact with the spherical end 156 and exhibiting a coefficient of friction. The spherical end 156 can be constructed to include an aluminum base material and a surface coating deposited over the aluminum base material. The spring 117 can be preloaded according to the coefficient of friction of the rubber tips of the flanges 114 and the surface finish of the spherical end 156.

4. Hub

Figure 10:
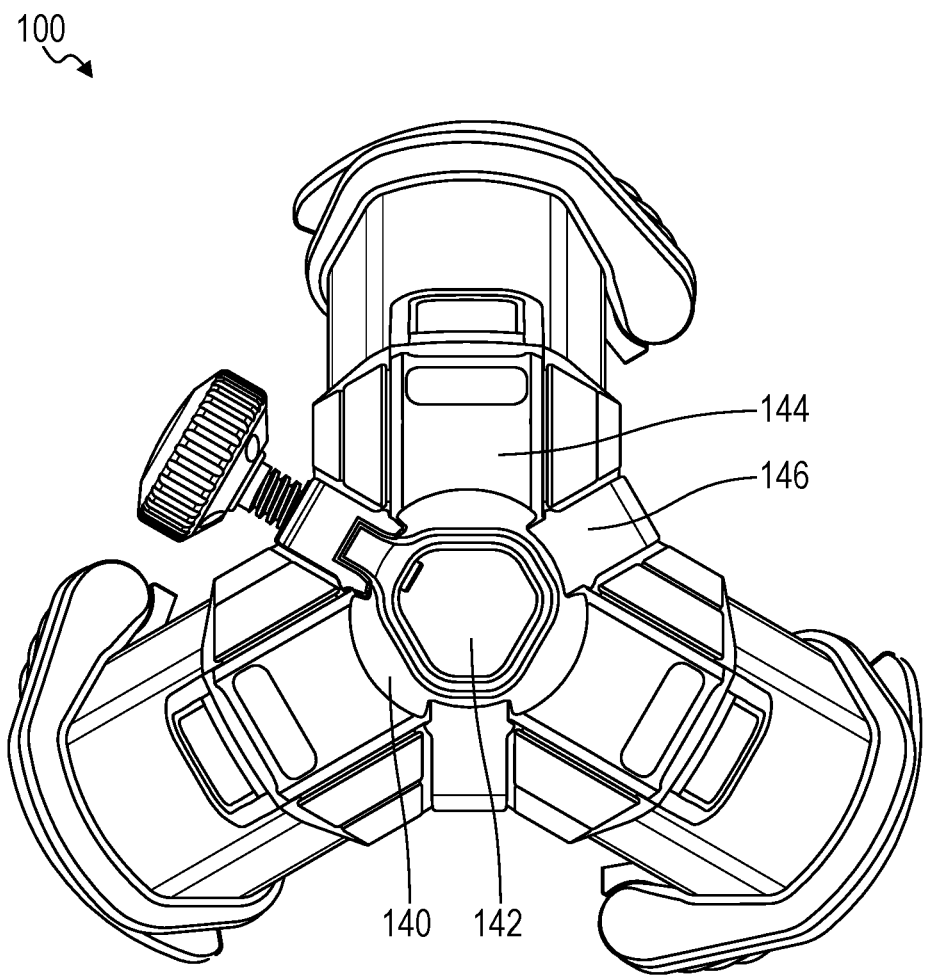
FIG. 10 is a schematic representation of a hub.

As shown in FIG. 10, the hub 140 includes: a central shaft (e.g., center bore 142) configured to slidably receive the center column 150; lobes 146 extending outward from the central shaft and including a locking assembly configured to interface with the center column 150; and leg mounts arranged in a radial pattern about the center bore 142 and 144 spaced between each adjacent pair of lobes 146, the leg mounts 144 configured to interface with leg hinge-joints.

Subsections of the leg mounts 144, the lobes 146, and the central shaft can combine to form a substantially hemispherical recess configured to receive a lower section of the spherical end 156 such that, in a fully collapsed state, the flanges 114 of the head 110 and the leg mounts 144 of the hub 140 and leg sections encapsulate the spherical end 156. By configuring the spherical end 156 to nest within the head 110 and hub 140, the tripod 100 exhibits increased vertical and volumetric efficiency and minimizes negative space.

In one implementation, the hub 140 section includes a set of magnets configured to interact with magnetic features of each other section of the tripod (e.g., the head 110, the legs 160), such that the tripod 100 maintains a collapsed state in the absence of user interaction.

4.1 Center Bore

The hub 140 defines a center bore 142 of the tripod 100. The center bore 142 of the hub 140 can be configured to receive the center column 150 as well as lock the center column 150 in place. Generally, the center bore 142 defines a non-circular cross-section, thus preventing the center column 150 from rotating within the center bore 142. The center bore 142 can include a shaft bushing (e.g., a rubber or bronze bushing) in order to limit wear on the center column 150 resulting from extension and retraction of the center column 150 in the hub 140 over time.

In one implementation, the center bore 142 defines a hexagonal cross section having irregular sides such that three non-adjacent faces of the center bore 142 each form the inner face of a hub lobe, and the remaining three non-adjacent faces of the center bore 142 each form the inner face of the base of each leg mount section.

4.2 Lobes of the Hub

The hub 140 includes a set of lobes 146 extending outward from the central shaft. Each lobe can include an inner space to hold either a primary or secondary lock assembly configured to retain the center column 150 in a fixed or semi-fixed state. In one implementation, the space between each pair of lobes 146 is configured to nest a leg of the tripod 100.

4.2.1 Center Column Lock Assembly

A first lobe of the hub 140 can include the primary lock assembly. The primary lock assembly can include a cambered rocker arm placed within the first lobe and configured to apply force to the center column 150 when engaged by a threaded hand-screw. The rocker arm can be pinned at a bottom end of the rocker bar such that, when a hand-screw applies force at a top end of the rocker bar, the camber of the rocker bar (in connection with the top and bottom force points) creates an area of contact at a center area of the rocker bar. The camber of the rocker arm allows the rocker arm to disperse the force applied to the center column 150. Thus, a thin-walled center column can sufficiently support forces applied to the center column 150.

A ball-detent lock assembly can be disposed in a second lobe of the hub 140. The ball-detent lock assembly applies force in a first hub plane orthogonal to the central axis of the tripod 100 to hold the center column 150 in a temporarily fixed position. Each lobe of the hub 140 can include a ball-detent lock assembly. While the spring-loaded ball is in a position outside of the detent locations, the ball continues to apply force to the center column 150.

In one variation, the primary lock assembly includes a knob 148 configured to engage the cambered rocker arm. The knob 148 can be configured to extend in order to enable accessibility and easier adjustment when the tripod 100 is deployed and retract (e.g., nest between two legs) when the tripod 100 is collapsed or stored. For example, the knob 148 can include: a screw defining a threaded end and a splined bore; a shaft (e.g., a steel shaft) defining a first end press-fit into a cap and a second splined end configured to run inside the splined bore of the screw and to transiently couple to a magnetic element within the splined bore; and a spring configured to disengage the shaft from the magnetic element responsive to a user applying a force (e.g., pulling) on the cap in a direction opposite the magnetic element. In a collapsed state (e.g., when the tripod 100 is in storage), the second end of the shaft magnetically couples to and is retained inside of the splined bore by the magnetic element within the splined bore. Thus, in this collapsed state, the cap can nest between two adjacent legs 160 and therefore reduce a cross-section and an effective maximum diameter of the tripod 100. However, when a user pulls on the cap and overcomes magnetically coupling between the shaft and the magnetic element, the shaft disengages from the magnetic element and moves outwardly from the splined bore, and the spring retains the shaft in this extended state. In this extended state, the cap of the knob 148 is offset outwardly from the two adjacent legs, thereby enabling greater access to the knob 148 and easier adjustment of the center column position for the user. To return the cab to the retracted state, the user may depress the cap, thereby overcoming the spring and re-coupling the shaft to the magnetic element.

4.3 Leg Mounts

Generally, the leg mounts 144 are configured to connect each leg of the leg section to the hub 140 at a hinge joint. The leg mounts 144 are also configured such that the flanges 114 of the spherical socket fit between the leg mounts 144 when the center column 150 is fully depressed into a collapsed state.

In one implementation, the leg mounts 144 include a multistage position stop (or "stop"), such that each leg can lock in at least a first position and a second position. For example, the stop can enable legs of the tripod 100 to operate in a set of positions including an open position defined by legs offset from the central axis and extending outwardly from the hub 140 at a first angle of 25-degrees (+/−2 degrees), a low position defined by legs offset from the central axis and extending outwardly from the hub 140 at a second angle between 75 and 85-degrees (+/−2 degrees), and a collapsed position defined by legs approximately parallel to the central axis.

4.4. Packed Configuration

The leg mounts 144 extend from the hub 140 and are arranged in a radial configuration about the center axis (e.g., at 0-degree, 120-degree, and 240-degree intervals). Furthermore, interior faces of the leg hub 140 mounts are relieved to enable the spherical end 156 to nest in hub 140—that is, the interior faces of the leg hub 140 mounts are relieved to enable the spherical end 156 to drop into the hub 140 and to be encapsulated within the leg mounts 144. The hub 140 also defines gaps (or "opens") between adjacent ends of adjacent leg mounts 144, and the flanges 114—extending downwardly from the head 110 and spaced radially about the central axis of the head 110 (e.g., at 0-degree, 120-degree, and 240-degree intervals, like the leg mounts 144)—define widths (slightly) less than the gap width between adjacent leg mounts 144 such that these flanges 114 can nest in these gaps between leg mounts 144 when the tripod 100 is collapsed, thereby limiting total height and increasing volumetric efficiency of the collapsed tripod 100.

Furthermore, because the leg mounts 144 are relieved for the spherical end 156, the spherical end 156 can define a relatively large diameter, thereby enabling the flanges 114 and the hat 116 to cooperate to apply a relatively large clamping force to the spherical end 156 and thus support relatively large cantilevered masses arranged on the head 110 (e.g., a large telephoto lens installed on a camera mounted to the head 110) without increasing the height or reducing volumetric efficiency of the tripod 100 when collapsed. For example, the diameter of the spherical end 156 can be greater than a minimum distance from the top faces of the hub lobes 146 to the bottom face of the pivot control ring 124 when the tripod 100 is collapsed.

Furthermore, the legs 160 can include magnetic and/or ferrous elements arranged proximal their distal ends and configured to attract magnetic and/or ferrous elements in adjacent legs 160 when the tripod 100 is collapsed, thereby retaining these distal ends of the legs 160 in close proximity and preventing inadvertent expansion of the legs 160 during transport.

5. Center Column

The center column 150 can be configured to translate within the center bore 142 of the hub 140. The center column 150 can have a non-circular cross-section to prevent rotation of the center column 150 within the center bore 142. In one implementation, the center column 150 defines a tri-lobed cross-section. In this implementation, the center bore 142 defines a tri-lobed opening with lobes 146 radially centered between leg mounts 144 of the hub 140.

Figure 4:
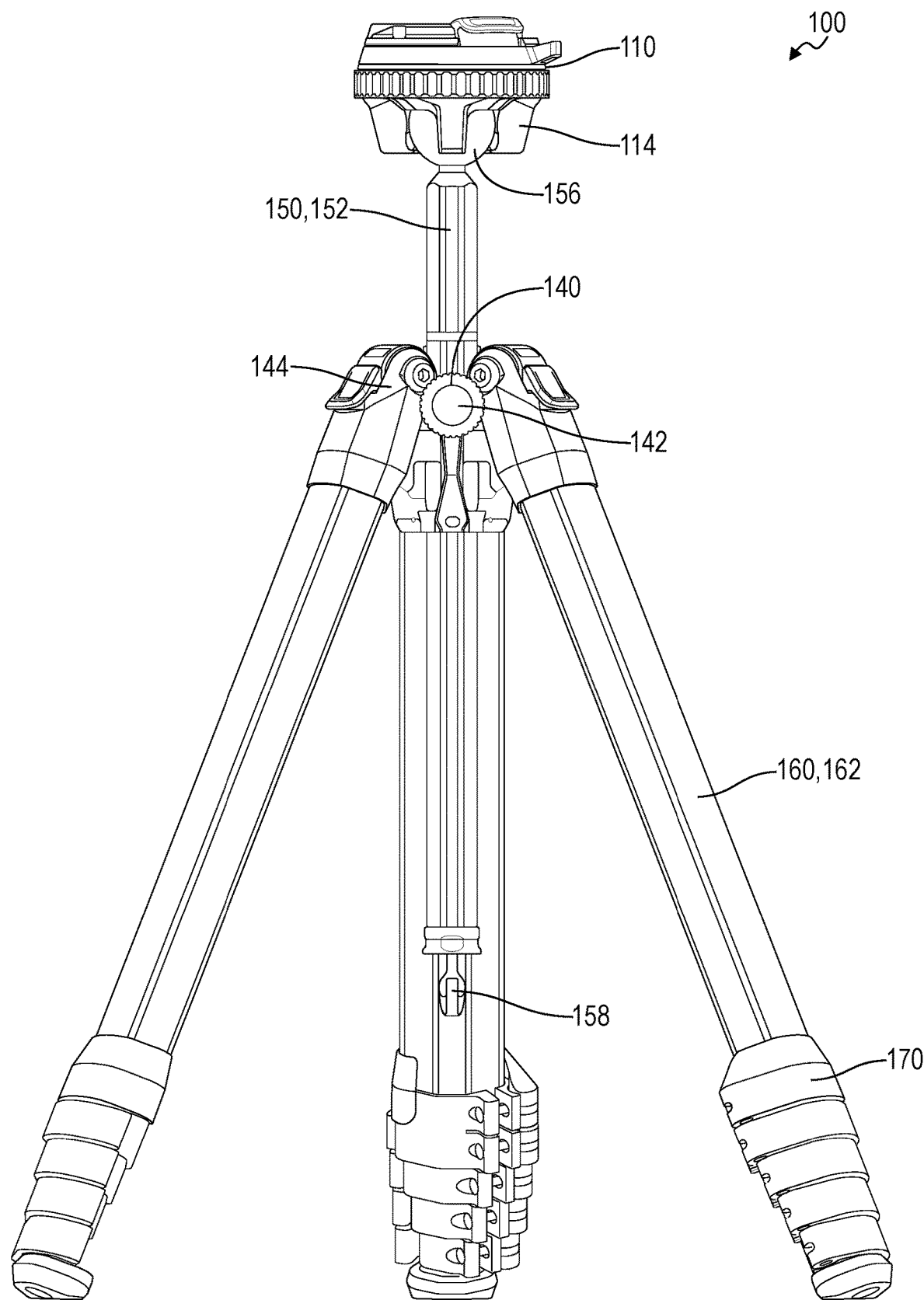

In another implementation, as shown in FIG. 4, the center column 150 can be segmented into a set of center column 150 modules. In this implementation, the center column 150 includes a center column stub 152 and a center column extension 154, wherein the center column stub 152 can be formed from a different material than the center column extension 154. The center column stub 152 can be attached or detached from the center column extension 154 via a fastener located within an access point inside the spherical end 156, accessible when the head 110 is actuated to a full 90-degree configuration. Moreover, modular instances of the center column 150 can be added to expand the total height of the tripod 100.

The center column stub 152 can function as a center column 150. In one implementation, the center column stub 152 can be of sufficient height such that the center column stub 152 a full range of motion for the head 110. The center column stub 152 can be separated from the center column extension 154 via a fastener within an access point in the spherical end 156, the access point accessible between the spherical socket flanges 114 when the main plane of the head 110 is in a 90-degree orientation with respect to the main axis of the tripod 100 (i.e. the main axis of the center column iso).

Furthermore, when legs 160 are deployed during operation but the center column 150 remains retracted, the head 110 can remain nested in the hub 140 section such that the hub 140 section mechanically engages and retains the head 110, thereby enabling the head 110 to support a large cantilevered load (e.g., a telephoto lens) rather than rely on friction between the spherical socket flanges 114, hat 116, and spherical end 156 to support this load.

The center column 150 can be constructed from a strong and durable material such that the center column 150 supports a minimum load. In one implementation, the center column 150 is constructed from aluminum.

5.1 Spherical End

The spherical end 156 can connect to a first end of the center column 150. Generally, the spherical end 156 can be housed in a socket of the head 110, such that the head 110 can pivot about the spherical end 156. In one implementation, the spherical end 156 is coupled to an end of the center column 150 opposite the set of legs 160 and is configured to nest between the leg mounts 144 of the hub 140.

In this implementation, the spherical end 156 can be configured to nest between the leg mounts 144 such that the spherical center of the spherical end 156 falls on or near a horizontal "pivot plane" intersecting the pivot axes of the legs 160, such as less than the spherical radius of the spherical end 156 from the pivot plane. Similarly, the spherical end 156 can be configured to nest between the leg mounts 144 such that a bottom of the spherical end 156 falls below the pivot plane and such that bottoms of the flanges 114 fall below the pivot plane when the head 110 is fully collapsed into the hub 14o.

The spherical end 156 can also include a scratch-resistant outer coating. In one implementation, the spherical end 156 is constructed from an aluminum base material and includes a scratch-resistant (e.g., rubberized or hard-anodize) coating over the aluminum base material.

5.2 Hanging Hook

A hanging hook 158 can connect to a second end of the center column 150, such that a user may hang a bag or weight from the hanging hook 158 for additional stability. Generally, the hanging hook 158 includes: a first projection having a first cross section including a profile matching an inner cross-section of the center column 150; a retractable second projection having a second cross section matching an outer cross-section of the center column 150; and a hook. The first projection can include a set of bosses configured to fit a set of detents on the inner walls of the center column 150. While retracted, the second projection allows for turning the first projection inside the center column 150, such that the set of bosses can access the set of detents. When not retracted, the second projection restricts rotation of the hanging hook 158 within the center column 150 by filling the (non-circular) interior cross-section of the center column 150.

In one implementation, the hanging hook 158 can also function as a hard stop for the center column 150, thereby preventing a user from unintentionally withdrawing the center column 150 fully out of the center bore 142 when raising the center shaft to a maximum height above the hub 140. For example, the hanging hook 158 can include a first end defining a hook configured to carry a weighted body and a second end opposite the hook and configured to attach to a distal end of the center column opposite the head to prevent passage of the distal end through the center bore of the hub. Thus, to release the center column 150 from the hub 140, the user may first remove the hanging hook 158 from the bottom end of the center column 150. (After removing the center column 150 from the hub 140, the user may also retrieve a mobile mount 180 from inside the center column 150, as described below.)

Figure 6:
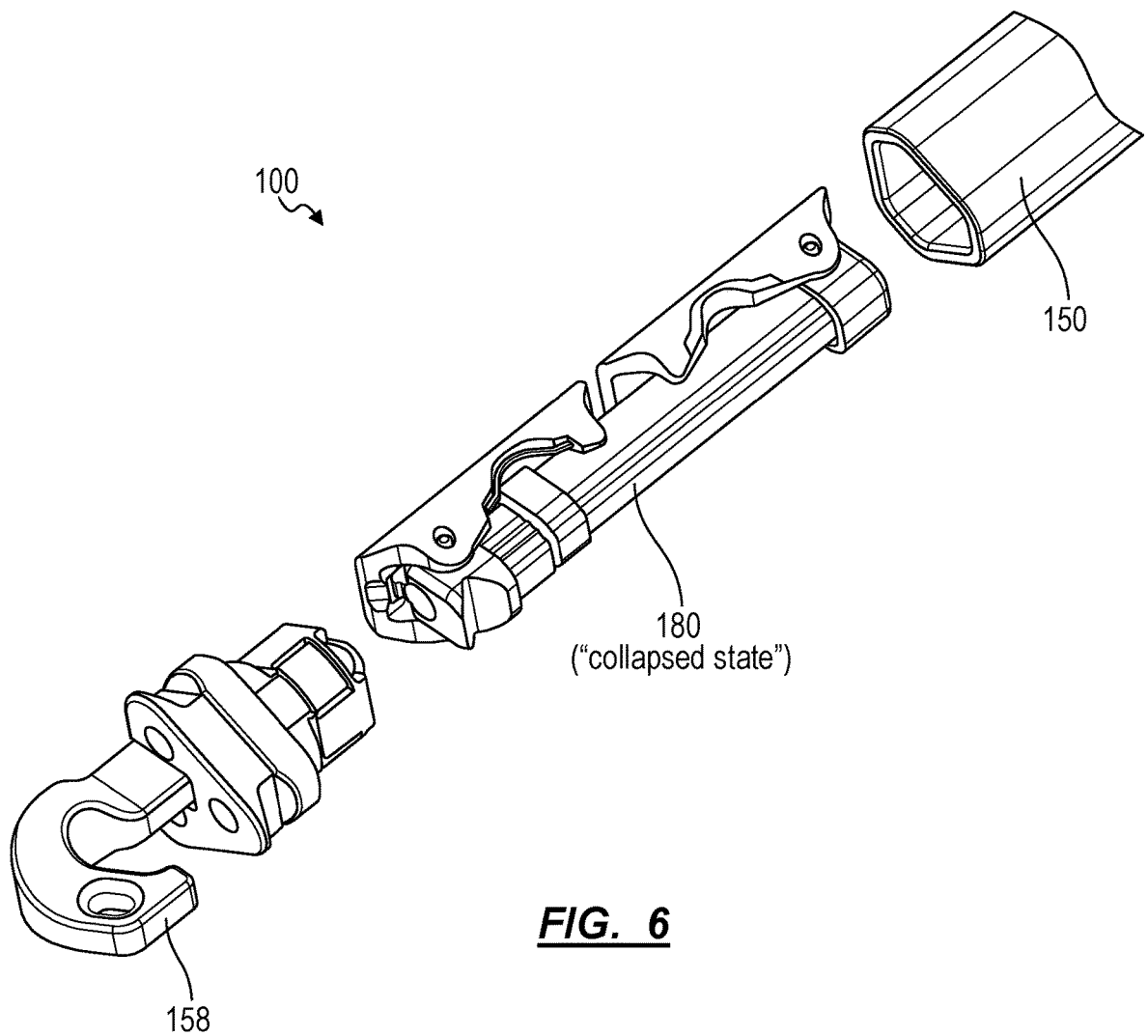
FIG. 6 is a schematic representation of a hanging hook and a mobile mount.

In one variation, as shown in FIG. 6, the hanging hook 158 can include: a first end defining a hook; and a second end opposite the hook and including a magnetic element configured to couple to a corresponding magnetic feature or ferrous element integrated into an end of a mobile mount 180—described below—stored inside the center column 150. In this variation, when the hanging hook 158 is locked into the center column 150, the hanging hook 158 can cooperate with a spring element located within the center column 150—offset above the hanging hook 158—to constrain the mobile mount 180 within the center column 150. Furthermore, when the mobile mount 180 is partially ejected from the bottom of the center column 150 but retained by the spring element, the magnetic element in the hanging hook 158 can couple to the magnetic or ferrous element in the mobile mount 180 in order to coaxially align the hanging hook 158 to the mobile mount 180 and the bore of the center column 150, thereby providing positive feedback to the user as the user inserts the hanging hook 158 into the center column 150.

Furthermore, when the tripod 100 is fully retracted, the center column 150 can locate the hanging hook 158 near feet at ends of the legs 160 such that the hook is physically accessible when the tripod 100 is fully retracted, thereby enabling a user to hook the tripod 100 directly to a bag (e.g., a camera or equipment bag), belt loop, or other hoop for transport.

5.3 Mobile Mount

Figure 7A:
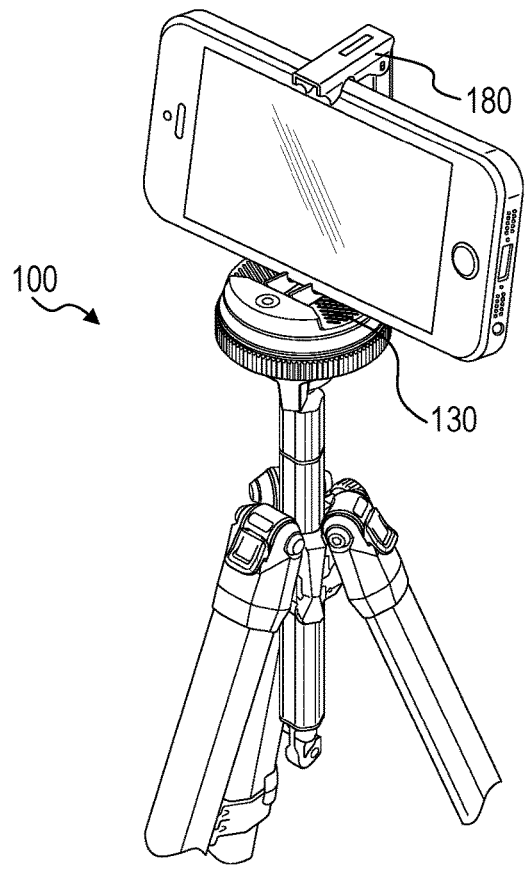
FIGS. 7A and 7B are schematic representations of a mobile mount.
Figure 7B:
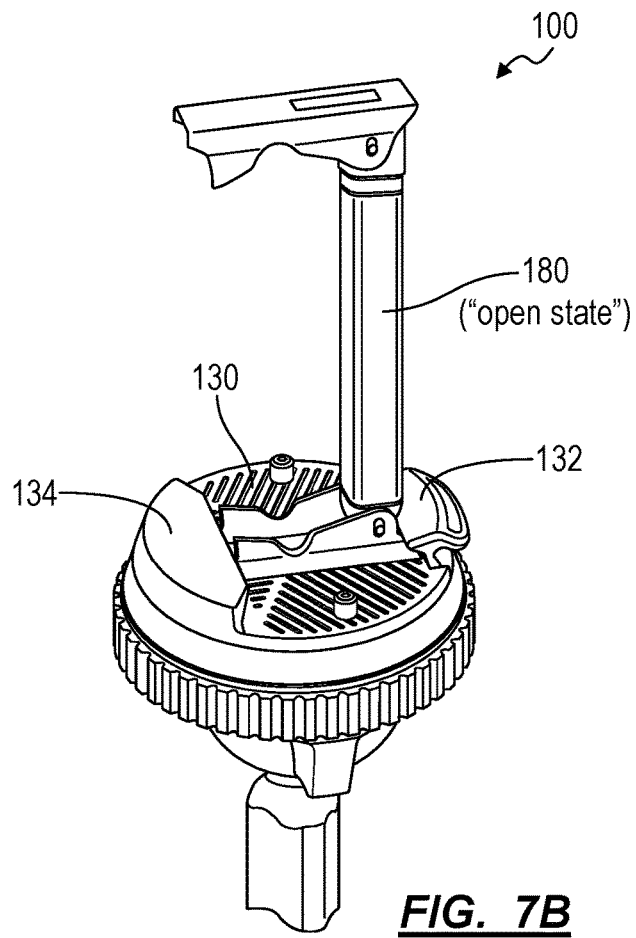

As shown in FIGS. 6, 7A, and 7B, the tripod 100 can also include a collapsible mobile phone mount 180 (hereinafter "mobile mount") arranged within the center column 150. Generally, the mobile mount 180 can be configured to receive and hold a mobile phone in an open position. The mobile mount 180 can be configured to transiently attach to the camera platform 130. The mobile mount 180 can collapse down to a diameter less than the diameter of the center column 150 in a closed position. In one variation, the mobile mount 180 is spring-loaded and magnetically attached within the center column 150, such that—upon removal of the hanging hook 158 at the end of the center column 150—the mobile mount 180 ejects itself from the center column 150 and expands into a deployed configuration for a user to clamp a mobile phone into, and then fix the mobile mount 180 onto the camera platform 130 of the tripod 100. Therefore, the center column 150 can define a cavity, opposite the spherical end 156, configured to house the mobile mount 180 in the collapsed state.

In one implementation, the center column 150: defines a distal end configured to receive the hanging hook 158 described above; and includes a spring loaded detent with a magnetic element offset above the distal end of the center column 150. In this implementation, the spring loaded detent can be offset above the distal end by less than a collapsed length of the mobile mount 180 such that the spring loaded detent retains the mobile mount 180 in the center column 150 with a portion (e.g., approximately ten millimeters) of the opposite end of the collapsed mobile mount 180 extending out of the distal end of the center column 150, thereby enabling a user to grasp and withdraw the mobile mount 180 from the center column 150 when the hanging hook 158 is removed from the center column 150 as shown in FIG. 6. However, when the hanging hook 158 is offered up to an end of the mobile mount 180 hanging out of the center column 150 and lifted up into the center column 150 by a user, the spring loaded detent can compress to accommodate insertion of the mobile mount 180 and the hanging hook 158 into the bore of the center column 150.

Therefore, the mobile mount 180 can include: a first magnetic feature configured to magnetically couple to the spring loaded detent inside the center column 150; and a second magnetic feature—opposite the first magnetic feature—configured to mate with a ferrous component located in the hanging hook 158.

For example, when the mobile mount 180 is collapsed, the mobile mount 180 can define a first end including a first magnetic feature and a second end including a second magnetic feature. The first magnetic feature can mate with a magnetic element located within the center column 150, the magnetic element configured to retain the mobile mount 180 within the center column 150. The second magnetic feature can mate with a ferrous component of the hanging hook 158, such that the hanging hook 158 can first connect (e.g., magnetically) to the mobile mount 180 when reattaching the hanging hook 158 to the tripod 100. Additionally, the mobile mount 180 can engage with the spring loaded detent located within the center column 150 such that, when the hanging hook 158 is attached to the center column 150, the mobile mount 180 is fully inserted within the center column 150 and the spring 117 is compressed. Then, when the hanging hook 158 is removed from the center column 150 (e.g., by the user), the mobile mount 180 can disengage from the spring loaded detent and drop down (e.g., drop one inch) within the center column 150 before the first magnetic feature of the mobile mount 180 engages the magnetic element in the center column 150. Therefore, when the hook is removed, the mobile mount 180 can drop slightly within the center column 150—without falling out of the center column 150 completely—such that a user may easily remove the mobile mount 180 from the center column 150.

Once removed from the bore of the center column 150, the mobile mount 180 can attach to the camera platform 130 to enable a user to mount a mobile device (e.g., a smartphone) to the tripod 100, as shown in FIG. 7A. For example, a user may: remove the hanging hook 158 from the center column 150; withdraw the mobile mount 180 from the center column 150 in the collapsed position; expand the mobile mount 180 to the open position to retain sides of a mobile device; locate the mobile mount 180 on the camera platform 130; and then rotate the camera lock ring 126 to lock the mobile mount 180 to the camera platform 130. After shooting with the mobile device, the user may: remove her mobile device from the mobile mount 180, which releases the mobile mount 180 to automatically return to the collapsed state; rotate the camera lock ring 126 to unlock the mobile mount 180 from the camera platform 130; remove the mobile mount 180 from the camera platform 130; insert the mobile mount 180 back into the center column 150; and replace the hanging hook 158 at the distal end of the center column 150.

5.4 Center Column Geometry

In one implementation, the center column 150 defines a tri-lobed cross-section, with each lobe radially centered between two adjacent legs 160 extending from the leg mount. In this implementation, recessed faces of the center column 150—between adjacent lobes 146—provide clearance for legs 160 of the tripod 100 to collapse more closely and enable the tripod 100 to reduce to a smaller maximum width when fully collapsed, as shown in FIG. 1. Additionally, lobes 146 of the tripod 100—radially offset by 120° about the center column 150—yield a larger effective moment of inertia and thus yield less deflection and vibration under greater load (e.g., a large camera and/or lens loaded onto the camera platform 130) and at greater extension above the hub leg mount 144. More specifically, this tri-lobed center column 150 defines three recessed faces—radially offset by 120°-and yields greater clearance along inside faces of the legs 160, thereby enabling the legs 160 to pack into a smaller volume when fully retracted and closed. Additionally, the tri-lobed center column 150 exhibits greater effective moment of inertia than a round or hexagonal column of the same dimension between recess faces, thereby enabling the center column 150 to carry greater loads at greater heights above the hub leg mount 144 with less deflection and lower vibration amplitude.

In another implementation, the center column 150 defines a cross-section including a number of sides equal to double a number of lobes 146 between adjacent legs extending from the leg mount. For example, the center column 150 can define a cross section of an irregular hexagon with a first set of three sides, each having a first length, and a second set of three sides, each having a second length. In this implementation the spherical end 156 includes three flanges 114, and the hub 140 includes three lobes 146. The central column can be dynamically locked in place by a screw locking mechanism that screws into threads along an axis orthogonal to the central main axis.

6. Legs

Each leg 160 includes leg sections 162 configured to nest within an adjacent leg section 162 by sliding along a shared axis. Smaller leg sections 162 can be locked in place by a set of leg section locks 172 (or "clamp assemblies"). The leg section locks 172 are activated by flip locks (e.g., c-clamps) that abut each leg joint. Generally, the leg section locks 172 define a height significantly shorter than a height of a leg section 162. In one implementation each leg 160 includes five distinct leg sections 162.

Each leg can splay outward from a central vertical axis up to an angle defined by a multistage leg position stop (or "stop"). Each leg is configured to splay further up to at least a second angle defined by the leg lock assembly responsive to actuation of the multistage leg position stop.

In one implementation, each leg includes a shaft with six faces, three inward-facing and three outward-facing, such that when the tripod 100 is in a fully collapsed state, each of the inward faces of each leg sit parallel with an inward face of an adjacent leg or a face of the central column.

Furthermore, because each leg defines a width (e.g., spans an arc length about the center axis) greater than its depth, each leg of the tripod 100 can thus exhibit a greater area moment of inertia in its bending axis and less deflection when subject to a yaw load than a round leg. Therefore, the legs 160 can cooperate to resist deflection and minimize vibration in yaw as a user rotates a camera—loaded onto the head 110—such as when shooting a video pan of a car drive-by.

6.1 Leg Assembly and Lightweight Mode

In one variation, as shown in FIG. 9, lower telescoping leg sections are removable from the uppermost leg section and are replaceable with a foot 164 insert for each leg of the tripod 100 in order to reduce overall weight of tripod 100, such as when a user is backpacking or otherwise desires reduced pack weight.

Figure 8A:
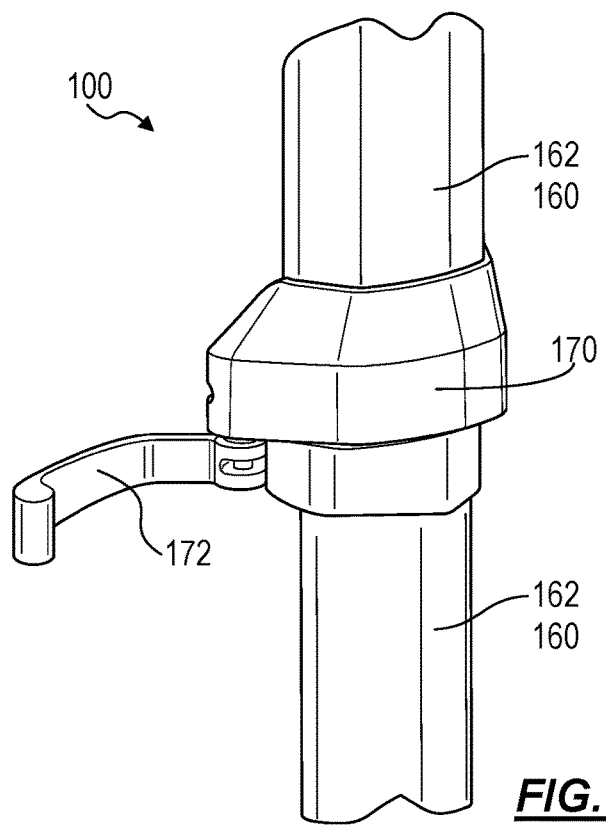
FIGS. 8A and 8B are schematic representations of leg clamps.
Figure 8B:
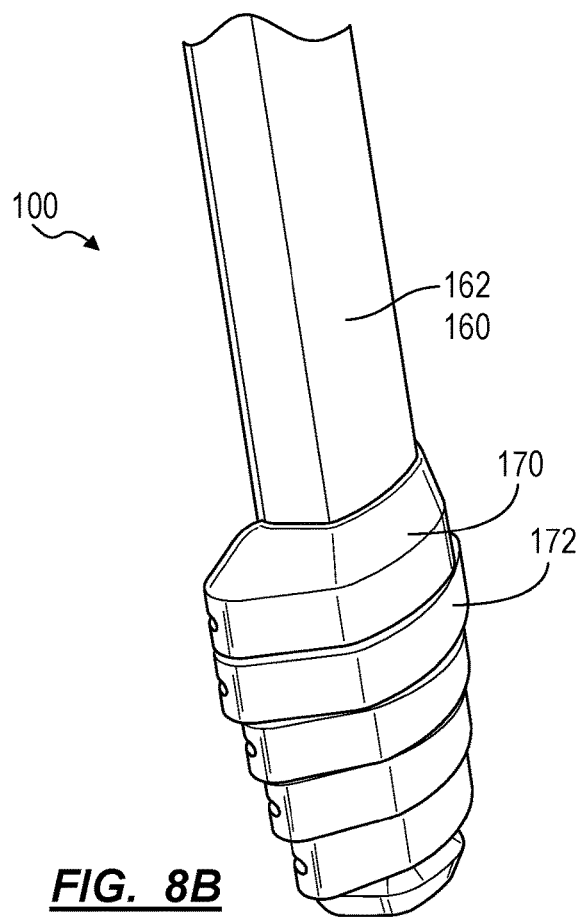

In one implementation, as shown in FIGS. 8A and 8B, the first leg of the tripod 100 includes a first, uppermost leg section defining: a proximal end pivotably coupled to the hub leg mount 144; a distal end defining a notch extending circumferentially about one lateral side of the first leg section; and a distal end including a perforation, dimple, or other engagement feature opposite the notch and configured to retain a foot 164, as described below.

In this implementation, the first leg of the tripod 100 further includes an upper clamp assembly 170. The upper clamp assembly 170 includes a c-clamp body defining: a longitudinal split extending along the full height of the c-clamp body; a clamp bore of internal cross-section approximating the outer cross-section of the distal end of the first leg section (e.g., ±1 millimeter); a lower clamp flange adjacent a first side of longitudinal split; an upper clamp flange adjacent the first side of the longitudinal split and above the lower clamp flange; a lower clamp surface adjacent a second side of the longitudinal split and facing the lower clamp flange; and an upper clamp surface adjacent the second side of the longitudinal split and facing the upper clamp flange. The upper clamp assembly also includes a leg bushing: arranged inside the clamp bore proximal a bottom of the c-clamp body to fill a gap between the clamp bore and an outer surface of a second leg section running inside the clamp bore; and including a flange configured to insert into the distal end of first leg section and to fill a gap between the internal bore of the first leg section and the outer surface of the second leg section running inside the first leg section.

In this implementation, the upper clamp assembly 170 further includes a lower clamp: pivoting transiently in the lower clamp surface; coupled to the lower clamp flange; configured to draw the lower clamp flange toward the lower clamp surface in a closed position in order to compress the c-clamp body around the second leg section running inside the c-clamp body and thus lock the upper clamp assembly 170 to the second leg section; and configured to release the lower clamp flange from the lower clamp surface in an open position in order to release the c-clamp body from the second leg section and thus enable the second leg section to telescope within the first leg section. Additionally, the upper clamp assembly 170 includes: an upper clamp pivoting transiently in the upper clamp surface; coupled to the upper clamp flange; configured to draw the upper clamp flange toward the upper clamp surface in a closed position in order to compress the c-clamp body around the distal end of the first leg section and thus lock the upper clamp assembly 170 to the first leg section; and configured to release the upper clamp flange from the upper clamp surface in an open position in order to release the c-clamp body from the first leg section and enable removal of the upper clamp assembly 170, all lower leg sections, and all lower clamp assemblies from the first leg section.

Furthermore, in this implementation, the c-clamp body defines a lateral split extending laterally from both sides of the longitudinal split between the upper and lower clamp flanges 114. The c-clamp body locates the lateral split adjacent the notch extending circumferentially about one lateral side of the distal end of the first leg section, thereby isolating compression of the c-clamp body—by the upper clamp in the closed position—onto the distal end of the first leg section rather than onto the second leg segment below, and similarly, isolating compression of the c-clamp body— by the lower clamp in the closed position—onto the proximal end of the second leg section rather than onto the first leg segment above.

Figure 5:
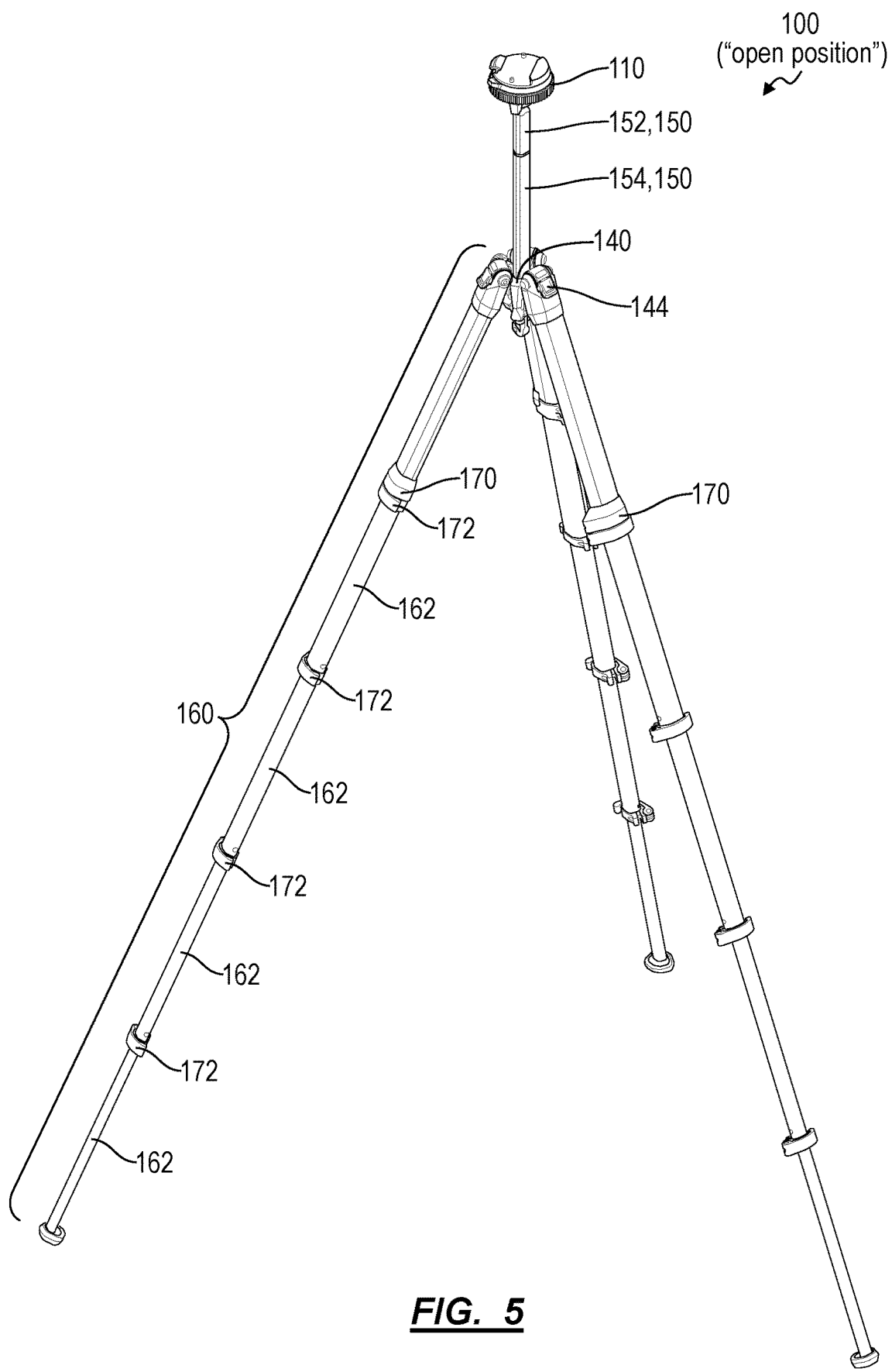

The first leg can include additional leg sections (e.g., second leg section, third leg section, etc.) with c-clamp assemblies (e.g., leg locks 172) interposed between these lower leg sections, as shown in FIGS. 5, 8A, and 8B. Additionally, each other leg in the tripod 100 can include leg sections of similar geometry and can include similar upper clamp assemblies.

Figure 9A:
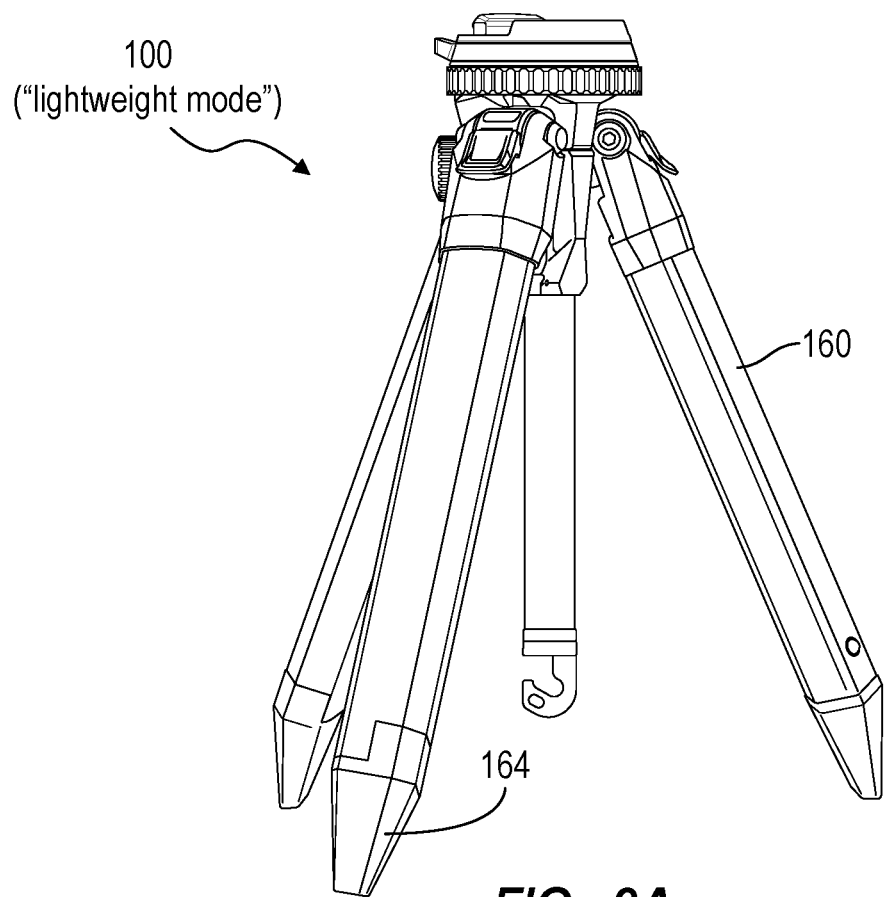
FIGS. 9A and 9B are schematic representations of a leg assembly.
Figure 9B:
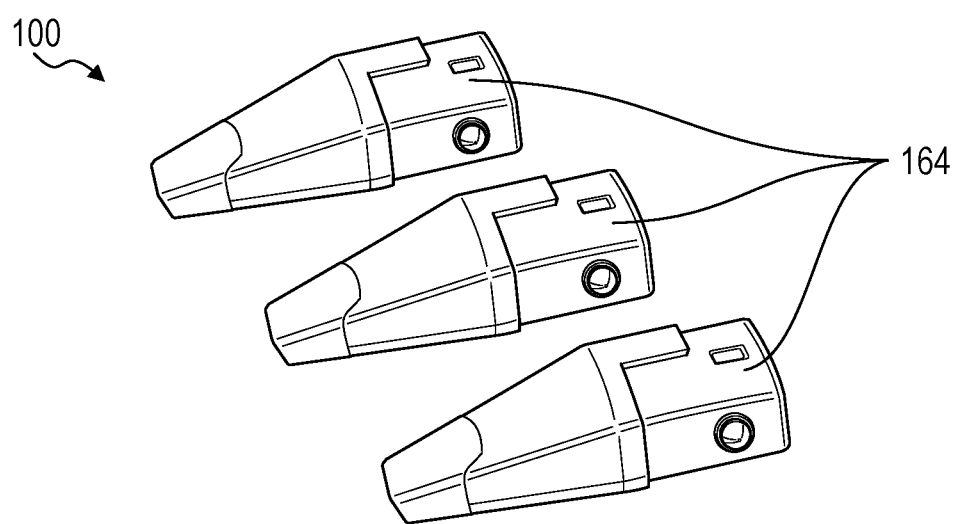

As shown in FIGS. 9A and 9B, the tripod 100 can further include a set of feet. In this variation, a foot includes a proximal end configured to insert into the distal end of an upper leg section—in a particular leg of the tripod 100— when the upper clamp assembly 170 and lower leg sections are removed from the upper leg section of this particular leg. The proximal end of the foot includes a detent configured to engage a perforation, dimple, or other feature defined at the distal end of the upper leg section in order to transiently retain the foot to this leg section. Additionally, the foot includes a foot surface extending longitudinally from its proximal end.

Therefore, for full height range adjustment in a full-assembly mode, the user: installs lower leg sections and upper clamp assemblies into each first leg section; and installs the center column extension 154 onto the center column stub 152. To reduce weight and maintain some height range adjustment in a lightweight mode, the user: removes lower leg sections and upper clamp assemblies from each first leg section; installs a foot into the distal end of each first leg section; and retains the center column extension 154 on the center column stub 152. To minimize weight in a full-lightweight mode, the user: removes lower leg sections and upper clamp assemblies from each first leg section; installs a foot into the distal end of each first leg section; and removes the center column extension 154 from the center column 150. However, in the full-lightweight mode, the tripod 100 can still enable some height adjustment. For example, the user may install the center column stub 152 in the center bore 142 of the hub 140 with the controls chassis either extending above the hub 140 (e.g., with a camera upright) or below the hub leg mount 144 (e.g., with the camera inverted).

As a person skilled in the art will recognize from the previous detailed description and from the figures and claims, modifications and changes can be made to the embodiments of the invention without departing from the scope of this invention as defined in the following claims.

We claim:

1. A tripod comprising:

a hub defining a center bore and a set of leg mounts arranged in a radial pattern about the center bore;

a set of legs, each leg in the set of legs pivotably coupled to a leg mount in the set of leg mounts and configured to telescopically extend from the hub;

a center column:

configured to translate within the center bore of the hub; and comprising a spherical end configured to nest between the leg mounts; and a head pivotably coupled to the spherical end and comprising:

a base section;

a camera platform arranged over the base section, defining a rail and a locking tab, and configured to transiently receive a camera adapter coupled to a camera;

a set of flanges arranged in the radial pattern, extending below the base section opposite the camera platform, extending around a section of the spherical end, and configured to nest between the leg mounts;

a hat arranged in the base section over the spherical end;

a pivot control ring arranged about the base section, configured to drive the hat into the spherical end to fix an orientation of the head on the spherical end responsive to rotation in a first direction about the base section, and configured to retract the hat from the spherical end to unlock the head from the spherical end responsive to rotation in a second direction about the base section; and a camera lock ring:
   arranged proximal the pivot control ring;
   concentric with the pivot control ring; and
   configured to drive the camera locking tab toward the rail to transiently lock the camera adapter between the camera locking tab and the rail.

2. The tripod of claim 1:
wherein the head further comprises:
   a threaded section extending along a central axis of the head and arranged over the spherical end;
   a sun gear threaded onto the threaded section and configured to translate along the threaded section when rotated;
   a spring arranged between the hat and the sun gear and configured to depress the hat against the spherical end; and
   a set of planet gears arranged about and meshed with the sun gear;
wherein the hat is arranged on the sun gear and is facing the spherical end; and
wherein the pivot control ring comprises a ring gear meshed with the set of planet gears, and configured to:
   rotate the sun gear about the threaded section via the set of planet gears, drive the hat toward the spherical end, clamp the spherical end against the set of flanges, and fix an orientation of the head on the spherical end responsive to rotation in the first direction about the base section; and
   rotate the sun gear about the threaded section via the set of planet gears, retract the hat from the spherical end, and unlock the head from the spherical end responsive to rotation in the second direction opposite the first direction.

3. The tripod of claim 1:
wherein the head further comprises an upper body coupled to the base section and rotatable about a pan axis of the base section;
wherein the camera lock ring is arranged on the upper section;
wherein the pivot control ring is arranged on the base section; and
wherein the head further comprises a panning control ring:
   interposed between the base section and the upper section;
   configured to lock the upper body to the base section responsive to rotation in the first direction about the base section; and
   configured to unlock the upper body from the base section responsive to rotation in the second direction.

4. The tripod of claim 1, wherein each leg mount in the set of leg mounts defines a stop configured to locate a leg in the set of legs at a first angle approximately between 23 degrees and 25 degrees from a central axis of the center column in an open position.

5. The tripod of claim 4:
wherein each leg in the set of legs are operable in a set of positions comprising
a collapsed position, the open position, and a low position;
wherein legs in the set of legs are approximately parallel to the central axis in the collapsed position;
wherein legs in the set of legs extend outwardly from the hub at the first angle from the central axis in the open position; and
wherein legs in the set of legs extend outwardly from the hub at a second angle between 75 degrees and 8 degrees from the central axis in the low position.

6. The tripod of claim 1, wherein the head further comprises a spring arranged behind the hat opposite the spherical end and configured to bias the hat onto the spherical end to withhold rotation of the head relative to the spherical end during rotation of the pivot control ring in the first direction.

7. The tripod of claim 1:
further comprising a mobile mount configured to:
   transiently attach to the camera platform; and
   expand from a collapsed state to an open state to retain a mobile device; and
wherein the center column defines a cavity, opposite the spherical end, configured to house the mobile mount in the collapsed state.

8. The tripod of claim 1:
wherein each leg in the set of legs comprises an upper leg section and a lower leg section removable from the upper leg section;
wherein the upper leg section defines a proximal end pivotably coupled to a leg mount in the set of leg mounts and a distal end; and
further comprising a set of feet, each foot in the set of feet comprising a proximal end configured to insert into the distal end of an upper leg section in replacement of a lower leg section of a leg in the set of legs.

9. The tripod of claim 1:
wherein the center bore defines a tri-lobed opening with lobes radially centered between leg mounts in the set of leg mounts;
wherein the center column defines a tri-lobed cross-section; and
wherein each leg in the set of legs comprises a shaft defining a set of faces, each set of faces comprising an inner face nesting against and facing the center column.

10. The tripod of claim 9:
wherein the legs in the set of legs define a width spanning an arc length about the center column and a depth extending outward from the center column, the width greater than the depth; and
wherein each leg in the set of legs comprises the shaft defining the set of faces comprising a set of six faces comprising:
   the inner face nesting against and facing the center column;
   a set of two inward-facing faces, each inward-facing face adjacent the inner face and nesting against and facing an adjacent leg; and
   a set of three outward-facing faces.

11. The tripod of claim 1:
wherein the set of legs pivot about pivot axes intersecting a horizontal pivot plane;
wherein the spherical end:
   is characterized by a spherical center and a spherical radius; and
   is configured to nest between the leg mounts with the spherical center offset from the horizontal pivot plane by less than the spherical radius; and
wherein the set of flanges are configured to nest between the leg mounts with bottom sections of the set of flanges extend below the horizontal pivot plane.

12. A tripod comprising:
a spherical end; and
a head pivotably coupled to the spherical end and comprising:

a base section;
a camera platform arranged over the base section and configured to transiently receive a camera adapter coupled to a camera;
a threaded section extending along a central axis of the head and arranged over the spherical end;
a sun gear threaded onto the threaded section and configured to translate along the threaded section when rotated;
a hat arranged on to the sun gear and facing the spherical end;
a spring arranged between the hat and the sun gear and configured to depress the hat against the spherical end;
a set of planet gears arranged about and meshed with the sun gear;
a set of flanges extending from the base section opposite the camera platform, extending around a section of the spherical end, and arranged in a radial pattern about the spherical end; and
a pivot control ring arranged about the base section, comprising a ring gear meshed with the set of planet gears, and configured to:
rotate the sun gear about the threaded section via the set of planet gears, drive the hat toward the spherical end, clamp the spherical end against the set of flanges, and fix an orientation of the head on the spherical end responsive to rotation in a first direction about the base section; and
rotate the sun gear about the threaded section via the set of planet gears, retract the hat from the spherical end, and unlock the head from the spherical end responsive to rotation in a second direction opposite the first direction.

13. The tripod of claim 12:
wherein the camera platform defines a rail and a locking tab; and
further comprising a camera lock ring:
arranged proximal the pivot control ring;
concentric with the pivot control ring; and
configured to drive the camera locking tab toward the rail to transiently lock the camera adapter between the camera locking tab and the rail.

14. The tripod of claim 12:
further comprising:
a hub defining a center bore and a set of leg mounts arranged in the radial pattern about the center bore; and
a set of legs, each leg in the set of legs pivotably coupled to a leg mount in the set of leg mounts and configured to telescopically extend down from the hub; and
wherein the set of flanges are configured to nest between the leg mounts.

15. The tripod of claim 14:
further comprising a center column configured to translate within the center bore of the hub; and
wherein the spherical end is coupled to an end of the center column opposite the set of legs and is configured to nest between the leg mounts.

16. A tripod comprising:
a hub defining a center bore and a set of leg mounts arranged in a radial pattern about the center bore;
a set of legs, each leg in the set of legs pivotably coupled to a leg mount in the set of leg mounts and configured to telescopically extend from the hub;
a center column:
configured to translate within the center bore of the hub; and
comprising a spherical end configured to nest between the leg mounts; and
a head pivotably coupled to the spherical end and comprising:
a base section;
a camera platform arranged over the base section, defining a rail and a locking tab, and configured to transiently receive a camera adapter coupled to a camera;
a set of flanges arranged in the radial pattern, extending below the base section opposite the camera platform, extending around a section of the spherical end, and configured to nest between the leg mounts;
a threaded section extending along a central axis of the head and arranged over the spherical end;
a sun gear threaded onto the threaded section and configured to translate along the threaded section when rotated;
a hat arranged about the base section and on the sun gear and facing the spherical end;
a spring arranged between the hat and the sun gear and configured to depress the hat against the spherical end;
a set of planet gears arranged about and meshed with the sun gear; and
a pivot control ring:
arranged about the base section;
comprising a ring gear meshed with the set of planet gears;
configured to rotate the sun gear about the threaded section via the set of planet gears, drive the hat into the spherical end, clamp the spherical end against the set of flanges, and fix an orientation of the head on the spherical end responsive to rotation in a first direction about the base section; and
configured to rotate the sun gear about the threaded section via the set of planet gears, retract the hat from the spherical end to unlock the head from the spherical end responsive to rotation in a second direction opposite the first direction about the base section.

17. A tripod comprising:
a hub defining a center bore and a set of leg mounts arranged in a radial pattern about the center bore;
a set of legs, each leg in the set of legs pivotably coupled to a leg mount in the set of leg mounts and configured to telescopically extend from the hub;
a center column:
configured to translate within the center bore of the hub; and
comprising a spherical end configured to nest between the leg mounts and comprising an aluminum base material and a surface coating; and
a head pivotably coupled to the spherical end and comprising:
a base section;
a camera platform arranged over the base section, defining a rail and a locking tab, and configured to transiently receive a camera adapter coupled to a camera;
a set of flanges arranged in the radial pattern, extending below the base section opposite the camera platform, extending around a section of the spherical end and configured to nest between the leg mounts, each flange in the set of flanges comprising a pliable tip in contact with the surface coating of the spherical end;

a hat arranged in the base section over the spherical end;

a pivot control ring arranged about the base section, configured to drive the hat into the spherical end to fix an orientation of the head on the spherical end responsive to rotation in a first direction about the base section, and configured to retract the hat from the spherical end to unlock the head from the spherical end responsive to rotation in a second direction about the base section; and a spring:
  arranged behind the hat opposite the spherical end;
  configured to bias the hat onto the spherical end to withhold rotation of the head relative to the spherical end during rotation of the pivot control ring in the first direction; and
  preloaded to clutch the spherical end between the hat and pliable tips of the set of flanges.

18. A tripod comprising:
a hub defining a center bore and a set of leg mounts arranged in a radial pattern about the center bore;
a set of legs, each leg in the set of legs pivotably coupled to a leg mount in the set of leg mounts and configured to telescopically extend from the hub and comprising an upper leg section and a lower leg section removable from the upper leg section, the upper leg section:
  defining a proximal end pivotably coupled to a leg mount in the set of leg mounts and a distal end; and
  comprising an upper clamp assembly comprising:
    a clamp body defining:
      a longitudinal split extending along a height of the clamp body;
      a clamp bore of internal cross-section approximating an outer cross-section of the distal end;
      a lower clamp flange adjacent a first side of the longitudinal split;
      an upper clamp flange adjacent the first side of the longitudinal split and above the lower clamp flange;
      a lower clamp surface adjacent a second side of the longitudinal split and facing the lower clamp flange; and
      an upper clamp surface adjacent the second side of the longitudinal split and facing the upper clamp flange; and
    a leg bushing:
      arranged inside the clamp bore proximal a bottom of the clamp body to fill a gap between the clamp bore and an outer surface of a lower leg section running inside the clamp bore; and
      comprising a flange configured to insert into the distal end to fill a gap between the internal bore of the upper leg section and the outer surface of the lower leg section running inside the upper leg section;
a set of feet, each foot in the set of feet comprising a proximal end configured to insert into the distal end of an upper leg section in replacement of a lower leg section of a leg in the set of legs;
a center column:
  configured to translate within the center bore of the hub; and
  comprising a spherical end configured to nest between the leg mounts; and a head pivotably coupled to the spherical end and comprising:
  a base section;
  a camera platform arranged over the base section, defining a rail and a locking tab, and configured to transiently receive a camera adapter coupled to a camera;
  a set of flanges arranged in the radial pattern, extending below the base section opposite the camera platform, extending around a section of the spherical end, and configured to nest between the leg mounts;
  a hat arranged in the base section over the spherical end; and
  a pivot control ring arranged about the base section, configured to drive the hat into the spherical end to fix an orientation of the head on the spherical end responsive to rotation in a first direction about the base section, and configured to retract the hat from the spherical end to unlock the head from the spherical end responsive to rotation in a second direction about the base section.

19. The tripod of claim 18, wherein the upper clamp assembly further comprises:
a lower clamp:
  pivoting transiently in the lower clamp surface;
  coupled to the lower clamp flange;
  configured to draw the lower clamp flange toward the lower clamp surface in a closed position to compress the clamp body around the lower leg section running inside the clamp body and lock the upper clamp assembly to the lower leg section; and
  configured to release the lower clamp flange from the lower clamp surface in an open position to release the c-clamp body from the lower leg section and enable the lower leg section to telescope within the upper leg section; and
an upper clamp:
  pivoting transiently in the upper clamp surface;
  coupled to the upper clamp flange;
  configured to draw the upper clamp flange toward the upper clamp surface in a closed position to compress the clamp body around the distal end of the upper leg section and lock the upper clamp assembly to the upper leg section; and
  configured to release the upper clamp flange from the upper clamp surface in an open position to release the clamp body from the upper leg section, enable removal of the upper clamp assembly from the upper leg section, and enable removal of the lower leg section from the upper leg section.

20. A tripod comprising:
a hub defining a center bore and a set of leg mounts arranged in a radial pattern about the center bore;
a set of legs, each leg in the set of legs pivotably coupled to a leg mount in the set of leg mounts and configured to telescopically extend from the hub;
a center column:
  configured to translate within the center bore of the hub; and
  comprising a spherical end configured to nest between the leg mounts;
a head pivotably coupled to the spherical end and comprising:

a base section;
a camera platform arranged over the base section, defining a rail and a locking tab, and configured to transiently receive a camera adapter coupled to a camera;
a set of flanges arranged in the radial pattern, extending below the base section opposite the camera platform, extending around a section of the spherical end, and configured to nest between the leg mounts;
a hat arranged in the base section over the spherical end; and
a pivot control ring arranged about the base section, configured to drive the hat into the spherical end to fix an orientation of the head on the spherical end responsive to rotation in a first direction about the base section, and configured to retract the hat from the spherical end to unlock the head from the spherical end responsive to rotation in a second direction about the base section; and a hanging hook comprising:
a first end defining a hook configured to carry a weighted body; and
a second end opposite the hook and configured to attach to a distal end of the center column opposite the head to prevent passage of the distal end through the center bore of the hub.

\* \* \* \* \*